US009356451B2

(12) United States Patent
Kawahara et al.

(10) Patent No.: US 9,356,451 B2
(45) Date of Patent: May 31, 2016

(54) BATTERY CONTROL CIRCUIT HAVING MULTIPLE ADJUSTING UNITS

(71) Applicant: Hitachi Automotive Systems, Ltd., Hitachinaka-shi, Ibaraki (JP)

(72) Inventors: Youhei Kawahara, Hitachi (JP); Ryouhei Nakao, Mito (JP); Akihiko Kudo, Hitachinaka (JP); Akihiko Emori, Hitachi (JP); Kei Sakabe, Hitachi (JP)

(73) Assignee: Hitachi Automotive Systems, Ltd., Hitachinaka-shi (JP)

( * ) Notice: Subject to any disclaimer, the term of this patent is extended or adjusted under 35 U.S.C. 154(b) by 139 days.

(21) Appl. No.: 14/135,959

(22) Filed: Dec. 20, 2013

(65) Prior Publication Data
US 2014/0159671 A1  Jun. 12, 2014

Related U.S. Application Data

(63) Continuation of application No. 13/166,182, filed on Jun. 22, 2011, now Pat. No. 8,736,229.

(30) Foreign Application Priority Data

Jun. 28, 2010  (JP) .................. 2010-146711

(51) Int. Cl.
*H01M 10/46* (2006.01)
*H02J 7/00* (2006.01)
(Continued)

(52) U.S. Cl.
CPC ............ *H02J 7/0014* (2013.01); *B60L 3/0046* (2013.01); *B60L 7/14* (2013.01); *B60L 11/1803* (2013.01);
(Continued)

(58) Field of Classification Search
CPC ............................ H02J 7/1423; H02J 7/0013
USPC .................. 320/134, 116, 117, 118, 119
See application file for complete search history.

(56) References Cited

U.S. PATENT DOCUMENTS 5,982,142 A * 11/1999 Sullivan .............. H02J 7/0018
320/118
7,078,914 B2  7/2006 Yano et al.
(Continued)

FOREIGN PATENT DOCUMENTS

JP  2001-313081 A  11/2001
JP  2002-354698 A  12/2002
(Continued)

OTHER PUBLICATIONS

Japanese-language Office Action dated Jul. 2, 2013 with English translation (8 pages).
(Continued)

*Primary Examiner* — Edward Tso
(74) *Attorney, Agent, or Firm* — Crowell & Moring LLP

(57) ABSTRACT

A battery control circuit includes a voltage detection circuit for measuring voltages of electric cells, balancing circuits for balancing the voltages or SOCs of the electric cells, a signal input/output circuit for communicating with the outside, a power supply circuit having two modes: a normal mode and a low consumption mode, and a time management circuit. It receives a signal containing a period of time until the shift of the power supply circuit from the normal mode to the low consumption mode, and stores it in the time management circuit. If a command from the outside has not been sent for a predetermined period of time or when an operation stop command has been sent from the outside, the time management circuit causes the power supply circuit to continuously operate in the normal mode. Then, the battery control circuit monitors an operation continuation period in the normal mode, and causes the power supply circuit to shift to the low consumption mode when the operation continuation period matches the stored period of time.

13 Claims, 27 Drawing Sheets

(51) Int. Cl.
*B60L 3/00* (2006.01)
*B60L 7/14* (2006.01)
*B60L 11/18* (2006.01)

(52) U.S. Cl.
CPC ........... *B60L 11/1866* (2013.01); *H02J 7/0016* (2013.01); *H02J 7/0021* (2013.01); *B60L 2200/26* (2013.01); *B60L 2240/545* (2013.01); *B60L 2240/547* (2013.01); *B60L 2240/549* (2013.01); *Y02T 10/7005* (2013.01); *Y02T 10/7055* (2013.01); *Y02T 10/7061* (2013.01); *Y02T 10/92* (2013.01); *Y02T 90/16* (2013.01)

(56) References Cited

U.S. PATENT DOCUMENTS

| | | | |
|---|---|---|---|
| 2004/0178768 A1* | 9/2004 | Miyazaki | H02J 7/0026 320/116 |
| 2005/0062456 A1 | 3/2005 | Stone et al. | |
| 2007/0148539 A1 | 6/2007 | Pellenc | |
| 2008/0111520 A1 | 5/2008 | Sasaki | |
| 2008/0197806 A1 | 8/2008 | Ridder et al. | |
| 2008/0224662 A1 | 9/2008 | Hayakawa | |
| 2008/0284375 A1* | 11/2008 | Nagaoka | B60L 11/1855 320/116 |
| 2010/0052615 A1 | 3/2010 | Loncarevic | |
| 2010/0167659 A1 | 7/2010 | Wagner | |

FOREIGN PATENT DOCUMENTS

| | | |
|---|---|---|
| JP | 2003-282159 A | 10/2003 |
| JP | 2005-328603 A | 11/2005 |
| JP | 2007-244058 A | 9/2007 |
| JP | 2008-125268 A | 5/2008 |
| JP | 2008-526182 A | 7/2008 |
| JP | 2008-226596 A | 9/2008 |
| JP | 2009-17657 A | 1/2009 |
| JP | 2009-278709 A | 11/2009 |
| WO | WO 2012/002002 A1 | 1/2012 |

OTHER PUBLICATIONS

European Search Report dated Jul. 9, 2014 (three pages).
Japanese Office Action dated Sep. 2, 2014 with English translation (nine pages).

* cited by examiner

FIG. 15
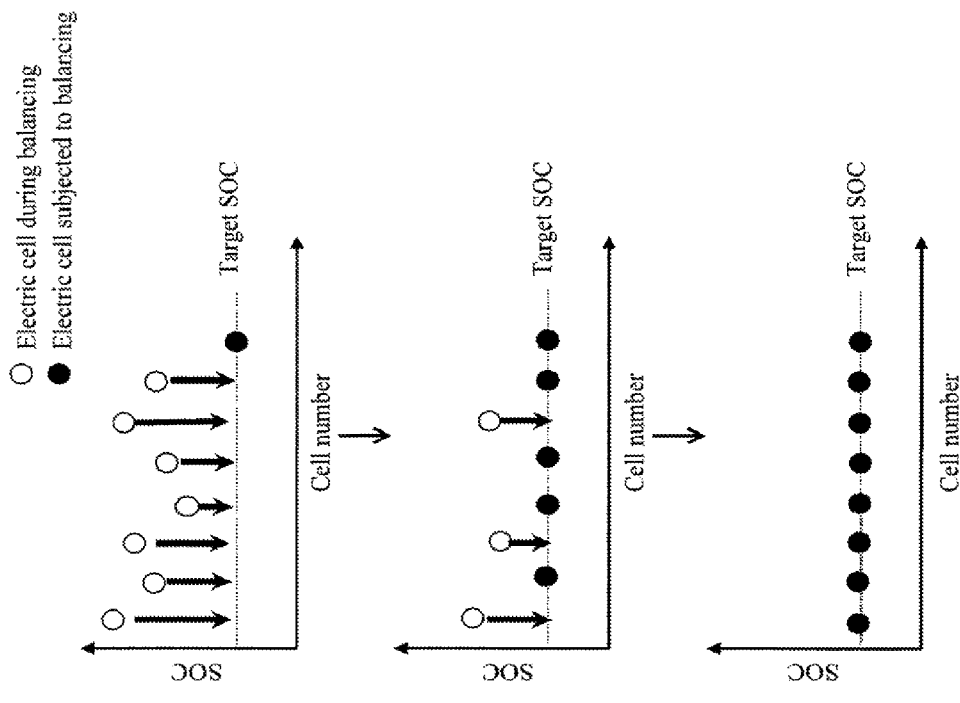
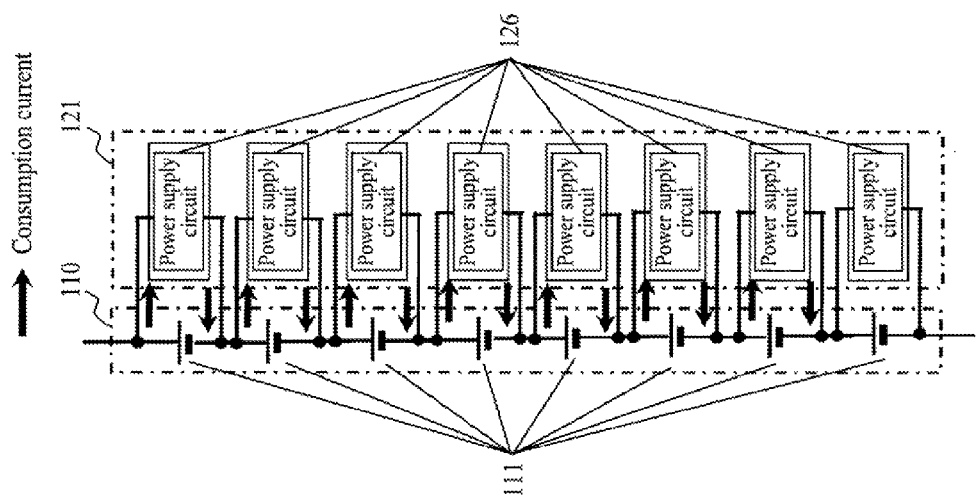

FIG. 18
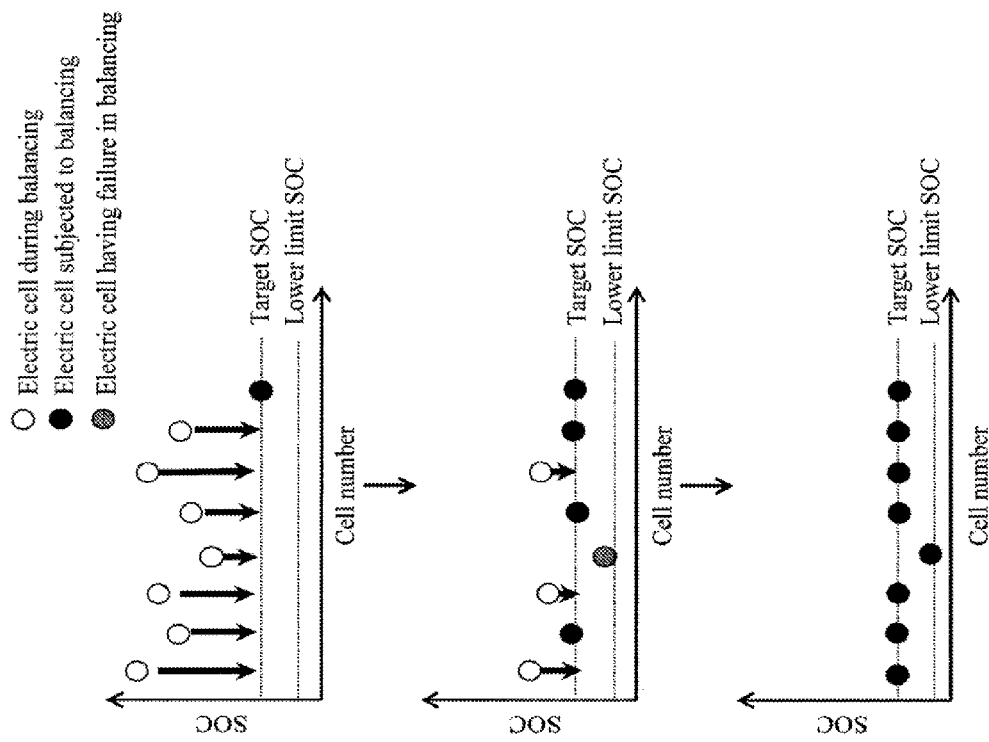
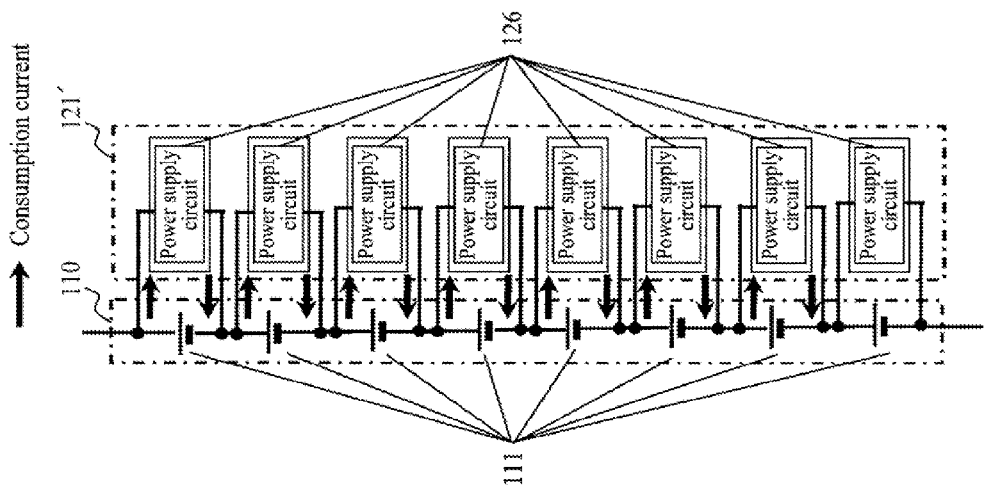

BATTERY CONTROL CIRCUIT HAVING MULTIPLE ADJUSTING UNITS

CROSS-REFERENCE TO RELATED APPLICATIONS

This application is a continuation of U.S. application Ser. No. 13/166,182, filed Jun. 22, 2011, which claims priority to Japanese Patent Application No. 2010-146711, filed Jun. 28, 2010; the entire disclosures of these applications are herein expressly incorporated by reference.

BACKGROUND OF THE INVENTION

1. Field of the Invention

The present invention relates to a battery control circuit to be mounted on a power supply device using an electric storage means such as a lithium secondary battery, a nickel-metal hydride battery, a lead battery, or an electric double-layer capacitor.

2. Description of the Related Art

In a power supply device, a distributed electric power storage device, an electric vehicle, or the like that uses an electric storage means such as a battery, a battery control circuit for managing the state of the electric storage means is mounted. A typical example of the state of the electric storage means to be managed by the battery control circuit is a State of Charge (SOC) indicating how much the electric storage means is charged or how much dischargeable electric charge remains.

In order to optimally use the electric storage means, it is necessary to take, for example, a measure to reduce the SOC if the SOC is too high or a measure to prevent a further drop of the SOC if the SOC is too low. In addition, when a power supply device uses multiple electric storage means which are connected in series, a SOC balancing function to keep the distribution of SOCs of the respective electric storage means within a certain range is needed to maximize the performance of the electric storage means.

As a method for SOC balancing of a multi-series battery among those mentioned above, a method is proposed in which voltages of blocks each including a certain number of battery cells are measured with a voltage detection circuit, and all of hardware means powered by the block having a high voltage of the blocks are turned on to promote discharging of the block (Patent Document 1).

Patent Document 1: Japanese Patent Application Publication No. 2009-278709

SUMMARY OF THE INVENTION

It is desirable that the state management of the electric storage means described above can be implemented with a simple process and a few number of instructions. In addition, when the SOC of the electric storage means is high and needs to be reduced promptly, it is also necessary to discharge the electric storage means with a larger current than usual. An objective of the present invention is to provide a battery control circuit capable of solving these problems.

A battery control circuit according to the present invention includes a voltage detection circuit for measuring a voltage of each electric cell forming an electric cell group, switches for connecting in parallel resistances to the respective electric cells so as to balance voltages or SOCs of the electric cells, a signal input/output circuit for communicating with a controller outside the battery control circuit, a power supply circuit having two modes: a normal mode and a low consumption current mode whose consumption current is smaller than the normal mode, and a low consumption current condition change circuit which stores a command value received from the outside through the signal input/output circuit, and is capable of changing a condition for causing the power supply circuit to shift from the normal mode to the low consumption current mode according to the command value. The low consumption current condition change circuit stores a period of time or a voltage as the command value.

When a period of time is stored as a command value, the low consumption current condition change circuit functions as a time management circuit. When the signal input/output circuit has not received any signal from the outside for more than a predetermined period of time or when the signal input/output circuit has received a signal instructing to stop the operation of the battery control circuit, the low consumption current condition change circuit starts to measure an operation period in the normal mode, and causes the power supply circuit to shift from the normal mode to the low consumption current mode when the measured period of time reaches the stored period of time.

In addition, when a voltage is stored as a command value, the low consumption current condition change circuit functions as a voltage management circuit. When the signal input/output circuit has not received any signal from the outside for more than a predetermined period of time or when the signal input/output circuit has received a signal instructing to stop the operation of the battery control circuit, the low consumption current condition change circuit starts to compare the stored voltage with a comparison target voltage, which is any of the highest voltage, an average voltage, and the lowest voltage of voltages of the multiple electric cells detected by the voltage detection circuit, and causes the power supply circuit to shift from the normal mode to the low consumption current mode when the comparative target voltage falls below the stored voltage. The comparative target voltage may also be a voltage determined by a predetermined method on the basis of voltages of the multiple electric cells detected by the voltage detection circuit.

According to the present invention, the battery control circuit can continue to operate in the normal mode for a set period of time even after the operation of various devices using electric storage means is stopped. This makes it possible to discharge the electric storage means even while the operation of the various devices is stopped if the SOC of the electric storage means which powers the battery control circuit is high, so that the SOC can be easily reduced.

In addition to the functions described above, the battery control circuit of the present invention has a function (1) to activate the voltage detection circuit more continuously or frequently than in the normal mode, (2) to activate a balancing circuit for balancing SOCs of the electric storage means, or (3) to change an operation cycle of a timer for managing a period of time which the battery control circuit has, after storing a command value for shifting from the normal mode to the low consumption current mode. Since the above change allows increase in the consumption current of the battery control circuit, discharging of the electric storage means having a high SOC can be further facilitated. Thus, a battery control circuit capable of facilitating SOC reduction can be achieved.

Furthermore, in the present invention, in addition to the low consumption current condition change circuit, a time management circuit or a voltage management circuit is separately mounted in the battery control circuit. Should abnormality occur in the low consumption current condition change circuit and the battery control circuit continues to operate in the normal mode, the time management circuit can detect passage of too long time or the voltage management circuit can detect a voltage drop of the electric storage means, and send an instruction to the power supply circuit to shift to the low consumption current mode. Thereby, further SOC or voltage drop of the electric storage means can be prevented.

In addition, in the present invention, any individual difference in consumption current which exists between the battery control circuits can be reduced through operation of the time management circuit.

In addition, an aspect in which a battery control circuit is provided for each of electric cells may also be employed. In that case, any switch or resistance for balancing voltages or SOCs of the electric cells is unnecessary, and the lower consumption current condition change circuit can have the balancing function.

According to the present invention, it is possible to provide a battery control circuit capable of optimally managing SOCs of multiple electric storage means, which are connected in series, through simple processing and a few number of instructions.

BRIEF DESCRIPTION OF THE DRAWINGS

FIG. 15 is a diagram illustrating SOC balancing of the electric storage means with the electric cell control means in the third embodiment of the present invention.

FIG. 18 is a diagram illustrating SOC balancing of the electric storage means with the electric cell control means in the fourth embodiment of the present invention.

DESCRIPTION OF THE PREFERRED EMBODIMENTS

Embodiments of the present invention will be described while taking as an example a case in which the present invention is applied to an electric storage device which constitutes a power supply of a plug-in hybrid electric vehicle (PHEV). Note that, the present invention is not limited to the PHEV but widely applicable to various electric storage devices to be mounted on a hybrid electric vehicle (HEV), an electric vehicle (EV), a railway vehicle, and the like. In addition, although it is assumed in the following embodiments that a lithium-ion battery having voltages in the range of 3.0 to 4.2V (average output voltage: 3.6V) is used as an electric storage/discharge device, which is a minimum unit of control, any other device may be used as the electric storage/discharge device as long as it can store and discharge electricity which causes inconvenience in use due to too high or low SOC. In this specification, those devices are collectively referred to as an electric cell. In addition, although a battery pack is configured by connecting electric cells in series in the embodiments to be described hereinafter, a battery pack may be configured by connecting in series electric cells which are connected in parallel, or by connecting in parallel electric cells which are connected in series.

Embodiment 1

Figure 1:
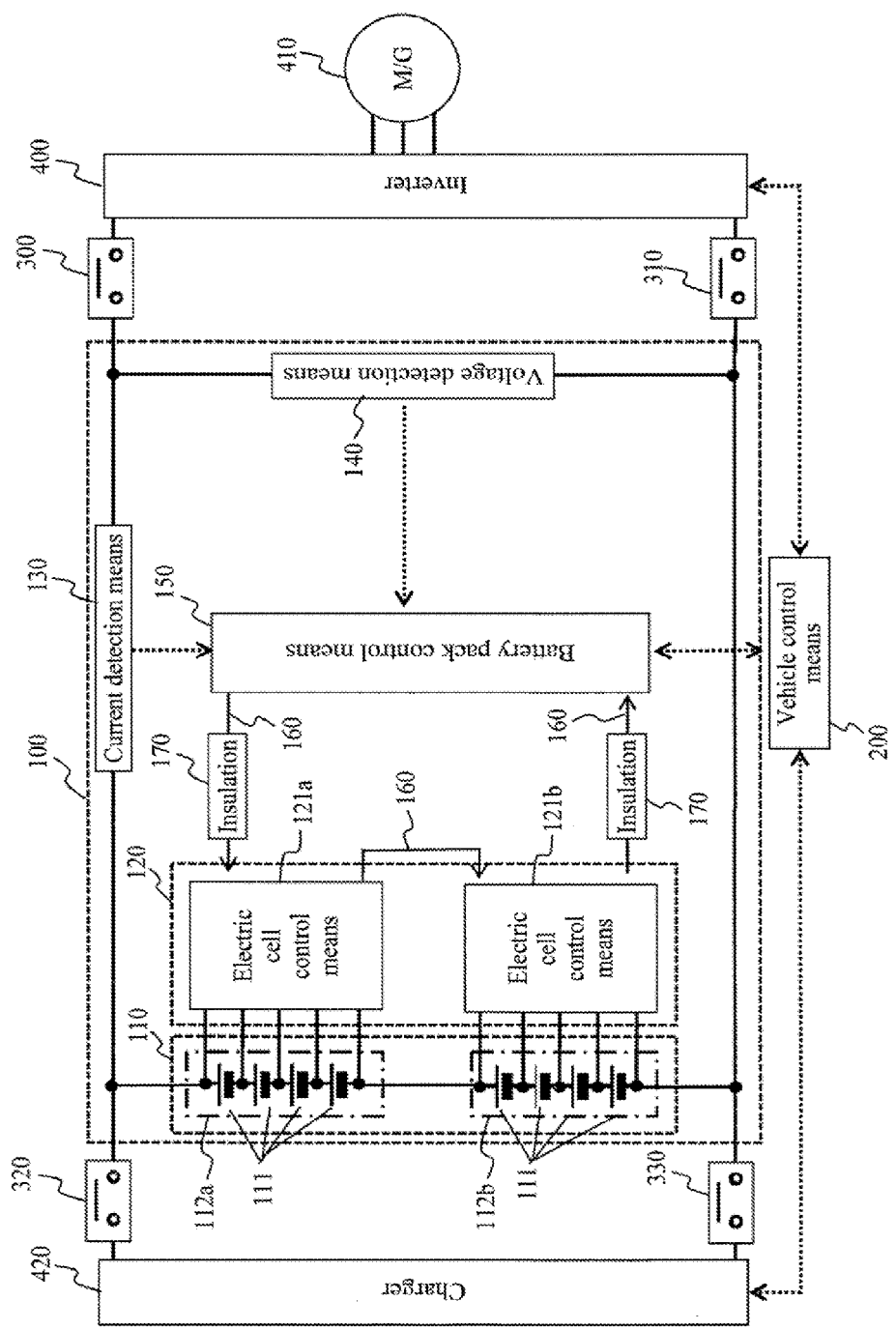
FIG. 1 is a block diagram showing a configuration example of an electric storage device of a plug-in hybrid electric vehicle according to the present invention.

A first embodiment of a battery control circuit according to the present invention will be described based on FIG. 1 to FIG. 7A and FIG. 7B. FIG. 1 shows a configuration example of an electric storage device of a plug-in hybrid electric vehicle according to this embodiment. A battery system 100 is connected to an inverter 400 through relays 300, 310 and connected to a charger 420 through relays 320, 330.

A configuration of the battery system 100 will be described by using FIG. 1. The battery system 100 mainly includes a battery pack 110 formed of multiple electric cells 111, an electric cell management means 120 for managing the state of the electric cells 111, a current detection means 130 for detecting a current which enters or exits from the battery pack 110, a voltage detection means 140 for detecting a total voltage of the battery pack 110, and a battery pack control means 150 for controlling the battery pack 110.

The battery pack 110 is configured by electrically connecting in series the multiple electric cells 111 capable of storing and discharging electric energy (charging and discharging DC power). The electric batteries 111 forming the battery pack 110 are divided into groups each including a predetermined number of cells for performing state management/control. The grouped electric cells 111 are electrically connected in series, forming electric cell groups 112a, 112b. The predetermined number may be determined to be the same for each group, for example, one, four, six, or any other number. Otherwise, different numbers may be employed as the predetermined number for the groups, such as a combination of four and six.

The electric cell management means 120 for managing the state of the electric cells 111 forming the battery pack 110 includes multiple electric cell control means 121a, 121b, and the electric cell control means 121a, 121b are assigned to the respective electric cell groups 112a, 112b obtained by the grouping mentioned above. The electric cell control means 121a, 121b operate by receiving power from the respectively assigned electric cell groups 112a, 112b, and monitor and control the state of the electric cells 111 forming the electric cell groups 112a, 112b.

In this embodiment, for simplicity of the description, four electric cells 111 are electrically connected in series to form each of the electric cell groups 112a, 112b, and the two electric cell groups 112a, 112b are further electrically connected in series to form the battery pack 110 having a total of 8 electric cells 111. In addition, the electric cell control means 121a, 121b for monitoring the state of the electric cells 111 are installed for the respective electric cell groups 112a, 112b.

The battery pack control means 150 and the electric cell management means 120 perform transmission and reception of signals by signal communication means 160 through insulating devices 170 typified by photo couplers. The insulating devices 170 are provided because the battery pack control means 150 and the electric cell management means 120 have different power supplies for operation. In this embodiment, while the electric cell management means 120 operates by receiving power from the battery pack 110, the battery pack control means 150 uses a battery for an in-vehicle accessory (14V-system battery, for example). The insulating devices 170 are mounted on a circuit board for providing the function of the electric cell management means 120. If the function of the electric cell management means 120 and that of the battery pack control means 150 are provided by a single board, the insulating devices 170 are mounted on the single board.

A description will be given of a means for communication between the battery pack control means 150 and the electric cell control means 121a, 121a, forming the electric cell management means 120, according to this embodiment. The electric cell control means 121a, 121b, which monitor the respective electric cell groups 112a, 112b, are connected in series in the descending order of potential of the electric cell groups. A signal transmitted by the battery pack control means 150 to the electric cell management means 120 is inputted into the electric cell control means 121a by the corresponding signal communication means 160 through the corresponding insulating device 170. Then, output of the electric cell control means 121a is inputted into the electric cell control means 121b through the corresponding signal communication means 160, and output of the electric cell control means 121b of the lowest order is transmitted to the battery pack control means 150 by the corresponding signal communication means 160 through the corresponding insulating device 170. Although a signal is transmitted and received between the electric cell control means 121a and the electric cell control means 121b not through an insulating device 170 in this embodiment, a signal may be transmitted and received through the insulating device 170.

The battery pack control means 150 and the electric cell control means 121a, 121b are connected in the form of a loop by the signal communication means 160. This loop connection is sometimes referred to as a daisy chain connection. Although the above connection mode and transmission/reception mode are employed in this embodiment, it is also possible to employ any other connection mode as long as the employed connection mode enables connection of the battery pack control means 150 and the electric cell control means 121 and transmission and reception of signals therebetween.

The battery pack control means 150 performs, for example, detection of the state of the electric cells 111, or the electric cell groups 112a, 112b formed by the electric cells 111, or the battery pack 110 formed by the electric cell groups 112a, 112b, on the basis of information transmitted from the electric cell management means 120, a value of a current entering and exiting from the battery pack 110 which is transmitted from the current detection means 130, a total voltage value of the battery pack 110 which is transmitted from the voltage detection means 140, information stored in advance in the electric cell control means 150 or a controller installed outside the battery pack control means 150, or other information.

The information outputted by the electric cell management means 120 to the battery pack control means 150 includes, for example, measured values of voltages or temperatures of the electric cells 111, abnormality information of the electric cells 111 such as overcharging, over discharging, overtemperature, or the like of the electric cells 111. In addition, the electric cell management means 120 may output to the battery pack control means 150 abnormal signals or the like in the case of a communication error of the electric cell management means 120 itself or the electric cell control means 121 forming the electric cell management means 120, or a physical failure typified by harness disconnection or the like. In this case, the battery pack control means 150 is capable of performing charging and discharging control of the battery pack 110 in light of contents of abnormality of the electric cell management means 120 or the electric cell control means 121a, 121b.

The information stored in advance in the battery pack control means 150 or the controller installed outside the battery pack control means 150 includes internal resistance characteristics, capacitance at the time of full charge, polarization voltage, degradation characteristics, individual difference information, correlation of SOC and Open Circuit Voltage (OCV), and the like. In addition, characteristic information of the electric cell management means 120, the electric cell control means 121a, 121b forming the electric cell management means 120, the battery pack control means 150, and the like can also be stored in advance.

Based on the measured values or the previously-stored information mentioned above, the battery pack control means 150 performs calculations necessary for managing the SOC or State of Health (SOH) of, the current or power which can be inputted or outputted of, or the abnormal state of one or more electric cells 111, or SOCs or voltages of the electric cells 111 forming the battery pack 110 to be described later. Then, based on the calculation result, the battery pack control means 150 outputs information to the electric cell management means 120 or to a vehicle control means 200.

The vehicle control means 200 is a high-order control device of the battery pack control means 150, and connects the battery system 10 and the inverter 400 through the relays 300, 310, or connects the battery system 100 and the charger 420 through the relays 320, 330 on the basis of the information transmitted by the battery pack control means 150. Note that, the vehicle control means 200 can transmit a command to the battery pack control means 150 as necessary, and the battery pack control means 150 may start processing based on a command from the vehicle control means 200. In addition, the battery pack control means 150 may perform the operation of connecting the battery system 100 to the inverter 400 or the charger 420 through the relays 300, 310, 320, 330.

The charger 420 is used to charge the battery pack 110 from a domestic power supply or an external power supply typified by a power feeding station. Although the charger 420 controls a charging voltage, charging current, or the like according to a command from the vehicle control means 200 based on the information of the battery pack control means 150 in this embodiment, the command to the charger 420 may be directly transmitted by the battery pack control means 150. In addition, the charger 420 may be installed inside or outside a vehicle, depending on the configuration of the vehicle, performance and intended use of the charger 420, conditions for installing an external power source, or the like.

When a vehicle system in which the electric storage device of FIG. 1 is mounted starts and runs, under the control of the vehicle control means 200, the battery system 100 is connected to the inverter 400, and drives a motor generator 410 based on energy stored in the battery pack 110. The battery pack 110 is charged by power generated by the motor generator 410 during regeneration. In addition, when a vehicle including the electric storage device of FIG. 1 is connected to a domestic power supply or an external power supply typified by a power feeding station, the battery system 100 and the charger 420 are connected based on information transmitted by the vehicle control means 200, and the battery pack 110 is thereby charged till a predetermined condition is satisfied. Energy stored in the battery pack 110 by charging is used next time the vehicle runs and also used to operate electrical equipment or the like inside or outside of the vehicle. It may also be discharged to an external power supply typified by a domestic power supply, as necessary.

A detailed configuration of the electric cell control means 121a, 121b forming the electric cell management means 120 in this embodiment will be described hereinafter. Then, detailed processing contents of the electric cell control means 121a, 121b and the battery pack control means 150 according to the present invention will be described.

Figure 2:
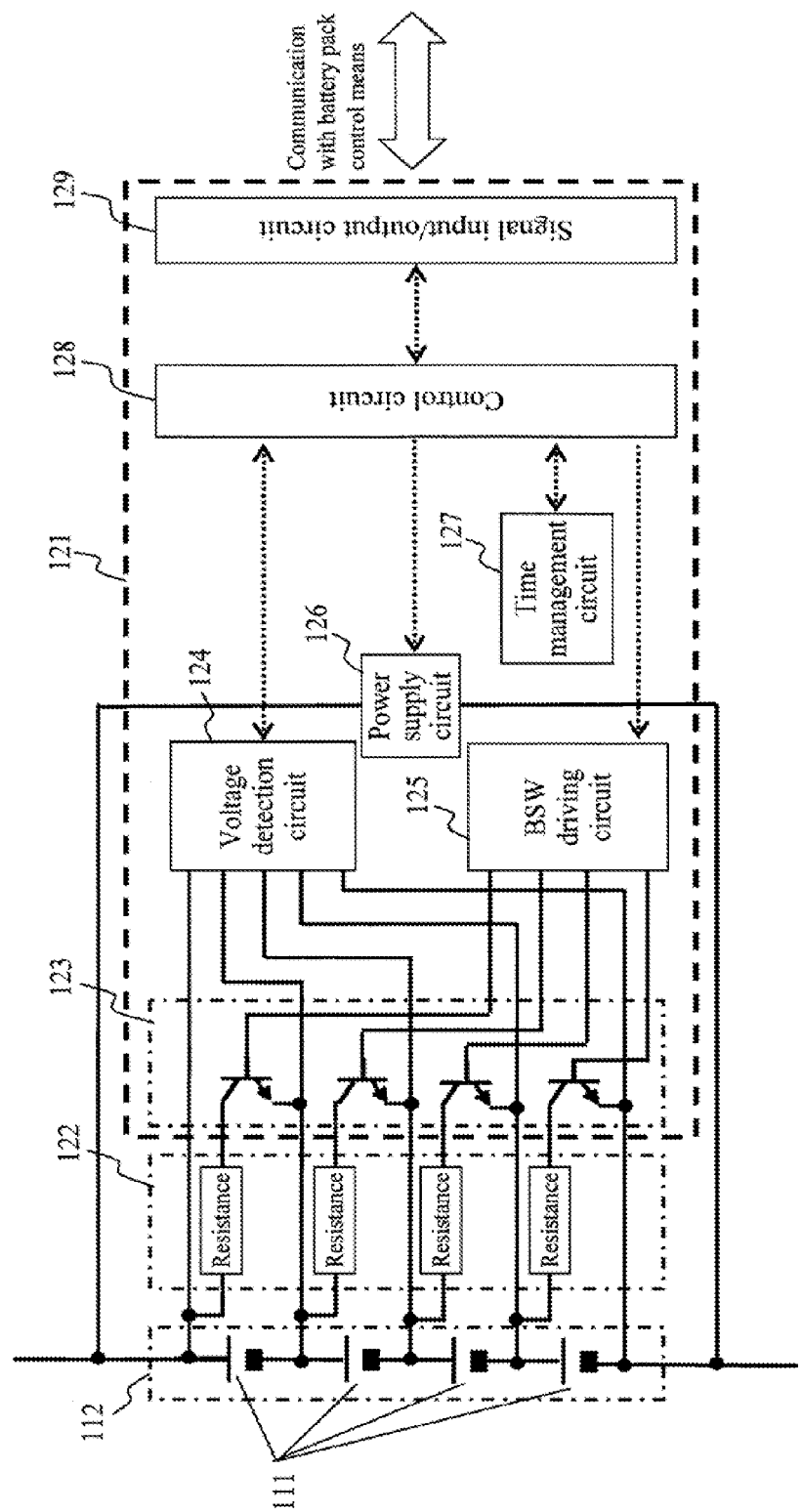
FIG. 2 is a block diagram showing a circuit configuration of an electric cell control means in a first embodiment of the present invention.

FIG. 2 shows a circuit configuration of the electric cell control means 121a, 121b in this embodiment (numerals of the electric cell control means are hereinafter simply described as 121). Each electric cell control means 121 includes: bypass switches 123 for connecting in parallel the electric cells 111 and bypass resistances 122 installed outside the electric cell control means 121, respectively; a BSW driving circuit 125 for driving the bypass switches 123; a voltage detection circuit 124 for measuring voltages of the electric cells 111 forming the electric cell groups 112a, 112b to be managed (numerals of the electric cell groups are hereinafter simply described as 112); a power supply circuit 126 for operating the electric cell control means 121 by energy supplied from the electric cell groups 112; a signal input/output circuit 129 for transmitting/receiving signals to/from the battery pack control means 150 or the adjacent electric cell control means 121; a control circuit 128 which is connected to the voltage detection circuit 124, the BSW drive circuit 125, the power supply circuit 126, the signal input/output circuit 129, and a time management circuit 127 to be described later, and performs processing and transmits/receives signals as necessary; and the time management circuit 127 for managing an operation period of the electric cell control means 121 on the basis of a signal transmitted from the battery pack control means 150. Note that, the signal input/output circuit 129 can be separately mounted as a signal input circuit and a signal output circuit. The bypass switches 123 installed inside the electric cell control means 121 can also be installed outside the electric cell control means 121.

The bypass resistances 122, the bypass switches 123, and the BSW driving circuit 125 are used to equalize SOC or voltage variation among the electric cells 111 forming the electric cell groups 112. The BSW driving circuit 125 turns on the bypass switch 123 corresponding to the electric cell 111 having a high SOC or voltage, so that energy stored in the electric cell 111 having a high SOC or voltage is consumed by the corresponding bypass resistance 122, which results in balancing of the SOCs or voltages of the electric cells 111 in the electric cell groups 112.

In the embodiment, the battery pack control means 150 recognizes a level of variation in SOC or voltage among the electric cells 111, calculates the amount of discharge of the electric cell 11, having a high SOC or voltage, needed to eliminate the variation, and issues a command to the electric cell control means 121 so that the corresponding bypass switch 123 can operate for a period of time enough for that amount of discharge. The command issued by the battery pack control means 150 is received by the signal input/output circuit 129 and conveyed to the control circuit 128. The control circuit 128 runs the BSW driving circuit 125 to operate the bypass switch 123 corresponding to the electric cell 111 which needs discharging. Note that, the electric cell control means 121 may perform the SOC or voltage balancing process described above alone by implementing the process of determination on SOC or voltage balancing described above in the control circuit 128. In addition, although SOC or voltage balancing is performed by discharging the electric cell 111 having a high SOC or voltage using the corresponding bypass resistance 122 in order to eliminate the SOC or voltage variation in the above description, the voltage balancing may be achieved by any other circuit which moves energy of the electric cell 111 having a high SOC or voltage to another electric cell 111 for balancing. Hence, any method may be employed as far as it is a method for eliminating the SOC or voltage variation among the electric cells 111.

The voltage detection circuit 124 is a circuit for detecting each of voltages of the electric cells 111 forming the electric cell group 112 to be managed by the electric cell control means 121. In this embodiment, the configuration is such that one voltage detection circuit 124 is provided for each of the electric cell groups 112. The voltage detection circuit 124 obtains voltage information of all electric cells 111 by detecting a voltage value while switching among the electric cells 111 to be detected. The order of switching among the electric cells 111 may be top to down or down to top of the electric cells in FIG. 2. The switching order may be changed in such a way that the electric cells 111 are selected in rotation or at random, depending on the property of the electric cells 111 or a system which uses the electric cells 111.

Note that, the voltage detection circuit 124 may be provided for each electric cell 111 or have a function to detect temperature information of the electric cell 111 as a voltage. In this case, a temperature sensor which can transmit a temperature as voltage information is installed in the electric cell 111. In addition, the voltage detection circuit 124 may regularly start to detect a voltage or temperature of the electric cell 111, or otherwise may start to detect a voltage or temperature of the electric cell 111 in response to a command from the control circuit 128 or the battery pack control means 150.

The power supply circuit 126 has a function to activate the electric cell control means 121 by supply of energy from the electric cell group 112 to be managed by the electric cell control means 121. The power supply circuit 126 switches between two modes of the normal mode and the low consumption current mode (or low power consumption mode) on the basis of a command from the control circuit 128. The power supply circuit 126 operates in the normal mode when the battery pack 110 is being charged or discharged and thus management of the electric cells 11 is needed or when all of the functions, such as operating conditions of the time management circuit 127 to be described later, included in the electric cell control means 121 are needed, such as while the battery pack control means 150 is issuing a commend. Meanwhile, the power supply circuit 126 shifts from the normal mode to the low consumption current mode when the battery pack 110 is unused, when no command has been issued for more than a predetermined period of time from the battery pack control means 150, when an operation stop command has been received from the battery pack control means 150, or according to an operation of the time management circuit 127 to be described later.

The low consumption current mode is a mode in which energy supply from the electric cell groups 112 can be made smaller than in the normal mode by activating only a part of the functions of the electric cell control means 121. As an example, the low consumption current mode is a mode in which the electric cell control means 121 runs only the function which enables the electric cell control means 121 to shift to the normal mode in response to communication from the outside, and in this embodiment, the power supply circuit 126 supplies power to at least the signal input/output circuit 129 and the control circuit 128. The electric cell control means 121 which has shifted the mode to the low consumption current mode can shift to the normal mode according to a command from the battery pack control means 150. The power supply circuit 126 has a role of supplying power to functional units such as the voltage detection circuit 124, the BSW driving circuit 125, the time management circuit 127, the control circuit 128, the signal input/output circuit 129, and the like. As an example, the power supply circuit 126 actualize switching between the two modes in such a way that it supplies power to all of the functional units mentioned above in the normal mode, and disconnects power supply paths with the voltage detection circuit 124, the BSW driving circuit 125, and the time management circuit 127 by using switches or the like in the low consumption current mode.

The control circuit 128 has a function to perform processing for managing the operation of the electric cell control means 121 by receiving information on the electric cells 111 detected by the voltage detection circuit 124, a command from the battery pack control means 150 through the signal input/output circuit 129, or information from the time management circuit 127 to be described later, and by transmitting information to the voltage detection circuit 124, the BSW drive circuit 125, the power supply circuit 126, the time management circuit 127, or the signal input/output circuit 129. The control circuit 128 may be provided only by hardware or implemented as software which runs some functions on the hardware. When no signal has been sent from the battery pack control means 150 for a predetermined period of time, when the control circuit 128 has received an operation stop command from the battery pack control means 150, or when the control circuit 128 has received a signal from the time management circuit 127 to be described later, the control circuit 128 sends a signal to the power supply circuit 126 to shift the mode to the low consumption current mode. Note that, if the electric cell control means 121 receives a signal from the battery pack control means 150 when the electric cell control means 121 is in the low consumption current mode, the control circuit 128 issues a signal to the power supply circuit 126 to shift the mode to the normal mode.

The time management circuit 127 has a function to store a period of time which is specified by the battery pack control means 150 and during which the electric cell control means 121 operates in the normal mode. Furthermore, when no signal has been sent from the battery pack control means 150 for a predetermined period of time, or upon reception of an operation stop command from the battery pack control means 150, the time management circuit 127 measures operating time of the electric cell control means 121 in the normal mode. Then, if the time management circuit 127 detects that the operation continuation period of the electric cell control means 121 in the normal mode exceeds the stored period of time, the time management circuit 127 transmits the detection result to the control circuit 128. Upon receiving the detection result, the control circuit 128 issues a command to the power supply circuit 126 to shift the mode to the low consumption current mode. A method for managing SOCs or voltages of the electric cells 111 using the time management circuit 127 will be described later.

When the battery pack control means 150 acquires voltage information of the electric cell 111 from the electric cell control means 121, the battery pack control means 150 specifies the electric cell control means 121 (121a or 121b) from which a voltage should be acquired. The specified electric cell control means 121 transmits voltage information of one or more electric cells 111 to be managed to the battery pack control means 150, and the battery pack control means 150 receives this information. In this case, a signal for requesting a voltage of the electric cell 111 to be transmitted by the battery pack control means 150 includes an address for identifying the electric cell control means 121 (identification number for identifying the electric cell control means 121) or the like. In addition, the electric cell control means 121 implements a function to determine whether or not the address contained in the voltage request signal points to the electric cell control means itself, and in order to actualize the function a unique address is set in advance in a storage circuit which is implemented in the electric cell control means 121.

The control circuit 128 included in the electric cell control means 121 checks an address contained in the voltage request signal received from the battery pack control means 150 through the signal input/output circuit 129. If the address matches an address set in the electric cell control means 121 itself, the control circuit 128 transmits voltage information of the electric cells 111 managed by the control circuit 128 itself to the battery pack control means 150 through the signal input/output circuit 129. Since the two electric cell control means 121 (121a and 121b) are provided in this embodiment, if the battery pack control means 150 needs to regularly receive voltage information of all the electric cells 111 forming the battery pack 110, the battery pack control means 150 transmits a voltage request signal to each of the electric cell control means 121 by specifying the electric cell control means 121a and the electric cell control means 121b alternately. In addition, as another method for acquiring voltages of the electric cells 111 forming the battery pack 110, multiple electric cell control means 121 may transmit voltages of the electric cells 111 all at once to the battery pack control means 150 in response to a single voltage request signal from the battery pack control means 150.

If SOC or voltage variation occurs among of the multiple electric cells 111 managed by the electric cell control means 121, the battery pack control means 150 issues a bypass switch on command to turn on the bypass switch 123 corresponding to the electric cell 111 having a high SOC or voltage in the corresponding electric cell group 112 to cause the corresponding bypass resistance 122 to consume energy of the electric cell 111 having a high SOC or voltage. This reduces the SOC or voltage of the specified electric cell 111, thus improving the SOC or voltage variation among the multiple electric cells forming the electric cell group 112.

The bypass switch on command signal transmitted by the battery pack control means 150 for turning on the bypass switch 123 contains an address for identifying the electric cell control means 121 whose bypass switch 123 should be turned on, as in the case of the voltage acquisition of the electric cell 111 as described above. Furthermore, an address for identifying the electric cell 111 whose corresponding bypass switch 123 should be turned on is sent as additional information. Note that, as a method for identifying the electric cell 111 whose corresponding bypass switch 123 should be turned on, the electric cells 111 may be specified one by one by means of their addresses, or otherwise, a data format may be employed with which the on/off state of the bypass switches 123 for the electric cell group 112 managed by the electric cell control means 121 can be changed all at once.

The control circuit 128 included in the electric cell control means 121 checks an address contained in a bypass switch on command signal received from the battery pack control means 150 through the signal input/output circuit 129. If the address matches an address set in the electric cell control means 121 itself, the control circuit 128 further checks an address or data for identifying the electric cell 111 whose corresponding bypass switch 123 should be turned on, and, based on this, causes the BSW driving circuit 125 to turn on the bypass switch 123 for the electric cell 111. The processing described above enables adjustment of SOC or voltage for each of the electric cells 111 managed by the electric cell control means 121.

The electric cell control means 121 has a function to store time data contained in a normal mode operation hold command signal in the time management circuit 127, upon receiving the signal from the battery pack control means 150. As in the case of the voltage request signal or the bypass switch on command signal for the electric cells 111 described above, the normal mode operation hold command signal contains an address for identifying the electric cell control means 121 which should set time in its time management circuit 127, and only the identified electric cell control means 121 stores time data in its time management circuit 127.

The control circuit 128 included in the electric cell control means 121 checks an address contained in a normal mode operation hold command signal received from the battery pack control means 150 through the signal input/output circuit 129. If the address matches an address set in the electric cell control means 121 itself, the control circuit 128 stores, in the time management circuit 127, time data contained in the command signal. When no command from the battery pack control means 150 has been sent for a predetermined period of time after the time data was stored, or when an operation stop command from the battery pack control means 150 has been sent, the time management circuit 127 measures operation continuation period in the normal mode. Then, if the time management circuit 127 detects operation continuation period in the normal mode which matches the stored time data, the time management circuit 127 notifies the control circuit 128 of the detection result. In response to this, the control circuit 128 sends a command to the power supply circuit 126 to shift the mode to the low consumption current mode.

Figure 3A:
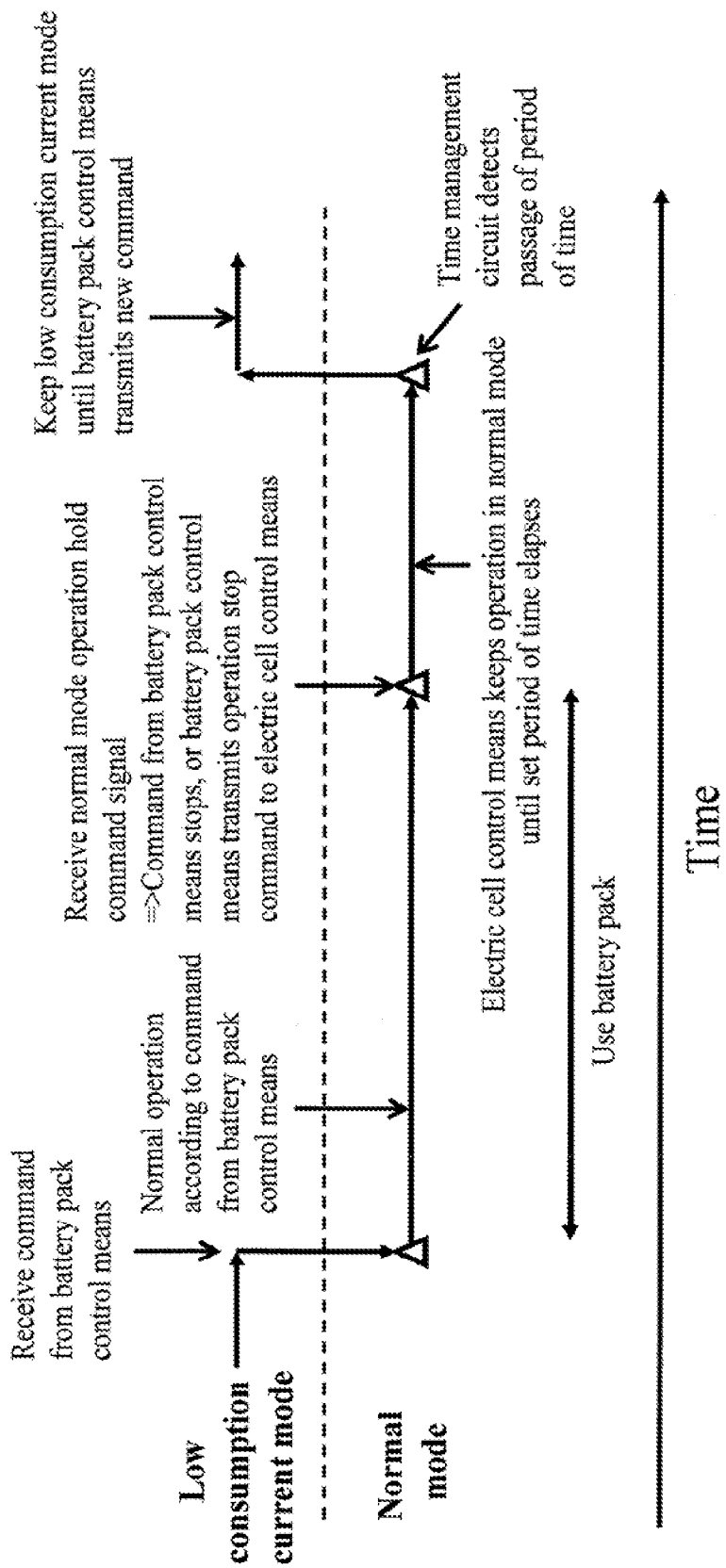
FIG. 3A is an explanatory diagram of an operation in the electric cell control means of the present invention.

FIG. 3A shows the operation of the electric cell control means 121 described above. When the battery pack 110 is used, such as when the battery pack 110 is charged or discharged or the like, management of the battery pack 110 by the battery pack control means 150 and the electric cell management means 120 is needed. Thus, after the battery pack control means 150 itself is started, the battery pack control means 150 sends a signal for starting the electric cell control means 121. Upon receiving the signal, the electric cell control means 121 shifts the mode from the low consumption current mode to the normal mode. Then, the electric cell control means 121 performs voltage acquisition or an on/off operation of the bypass switches 123 according to a command from the battery pack control means 150. If the battery pack 110 is not used any longer such as when charging or discharging of the battery pack 110 is stopped or the like, the electric cell control means 121 transitions to a procedure to stop the operation of the battery pack control means 150 or the electric cell management means 120 as well. In this event, the electric cell control means 150 transmits a normal mode operation hold command signal to the electric cell control means 121. The provision of the time management circuit 127 and the control circuit 128 in the electric cell control means 121 as described above enables the electric cell control means 150 to transmit a normal mode operation hold command signal on per electric cell control means 121 basis. The battery pack control means 150 stops its own operation (also stops a command to the electric cell control means 121) after sending the normal mode operation hold command signal or after sending an operation stop command to the electric cell control means 121. By storing time data for every time management circuit 127 of the electric cell control means 121, it is possible to provide the electric cell control means 121 capable of continuing operation in the normal mode even after charging or discharging of the battery pack 110 finishes and the operation of the battery pack control means 150 stops, for a single period of time or different periods of time set in the respective multiple electric cell control means 121.

Note that, if a single period of time needs to be set in the time management circuits 127 of the multiple electric cell control means 121, a method may be employed in which the same time data is stored in the time management circuits 127 of all the electric cell control means 121 on the basis of one normal mode operation hold command signal sent by the battery pack control means 150. In this case, the command to be sent by the battery pack control means 150 contains data, such as addresses, clearly indicating that the command is being transmitted to all the electric cell control means 121. In addition, in the electric cell control means 121 also, a function to recognize data information, such as an address, is provided as a circuit or implemented as software for recognizing that the received command is a command to be received by all of the electric cell control means 121.

Furthermore, when the electric cell control means 121 does not receive a normal mode operation hold command signal and a command from the battery pack control means 150 has not been sent for a predetermined period of time or when an operation stop command has been sent from the battery pack control means 150, the control circuit 128 included in the electric cell control means 121 makes a determination to send a command to the power supply circuit 126 to shift the mode to the low consumption current mode.

If the battery pack control means 150 transmits a new command to the electric cell control means 121 while the electric cell control means 121 holds the operation in the normal mode under control of the time management circuit 127 upon receiving a normal mode operation hold command signal, time data stored in the time management circuit 127 may be reset, or measurement of the operation continuation period in the normal mode by the time management circuit 127 may be aborted, or otherwise the overall operation of the time management circuit 127 may be stopped. This can prevent the time management circuit 127 and the control circuit 128 from sending a command to forcibly shift the mode to the low consumption current mode to the power supply circuit 126, while the battery pack control means 150 continues to send commands to the electric cell control means 121 to manage the electric cells 111 forming the battery pack 110, such as when charging or discharging of the battery pack 110 is started. In addition, as another method for avoiding a command to shift the mode to the low consumption current mode issued by the time management circuit 127 while the battery pack 110 is charged or discharged (while the electric cells 111 are managed by the battery pack control means 150 and the electric cell control means 121), the control circuit 128 may ignore a notification signal, which is sent when the time management circuit 127 detects the passage of the period of time, after the electric cell control means 121 receives a new command, or otherwise the power supply circuit 126 may ignore a command to shift the mode to the low consumption current mode which is sent by the control circuit 128, for example. The processing which the electric cell control means 121 performs after receiving a new command is the operation in the normal mode according to a command from the battery pack control means 150, except for avoiding the command to shift the mode to the low consumption current mode sent by the time management circuit 127, as described above.

In addition, the electric cell control means 121 may have a function to cause the time management circuit 127 to hold a remaining period of time for which the electric cell control means 121 should have continued operation in the normal mode or a period of time for which the electric cell control means 121 has continued operation in the normal mode, and notify the battery pack control means 150 of the held period of time according to a command from the battery pack control means 150. With the function to notify the battery pack control means 150 of the period of time included in the electric cell control means 121, the battery pack control means 150 can detect how long the time has elapsed before the system is restarted after the electric cell control means 150 itself stops, within a period of time set in the time management circuit 127. The period of time from the system stop to start received from the electric cell control means 121 can be used as a criterion to determine whether or not voltages measured from the respective electric cells 111 forming the battery pack 110 after the system restart may be treated as OCV, for example. Furthermore, if the battery pack control means 150 sends a normal mode operation hold command signal containing the above remaining period of time, the operation continuation in the normal mode under control of the time management circuit 127 can be resumed for the remaining period of time.

Furthermore, when the operation of the battery pack control means 150 stops with a period of time during which the operation in the normal mode should be kept being set in the time management circuit 127 of the electric cell control means 121 and when the battery pack control means 150 restarts and sends a new command while the electric cell control means 121 independently continues to operate in the normal mode, the time management circuit 127 can hold the set period of time during which the operation in the normal mode should be kept, suspend measurement of the operation continuation period in the normal mode, and hold a measured value of the suspended time. In this case, if the battery pack control means 150 stops again and stops sending a command or when an operation stop command has been sent from the battery pack control means 150, time measurement of the operation continuation period having been suspended is resumed, so that the operation in the normal mode can be continued till the set period of time elapses. This can eliminate the need for the battery pack control means 150 to again set a period of time in the time management circuit 127 included in the electric cell control means 121, by a normal mode operation hold command signal.

Figure 3B:
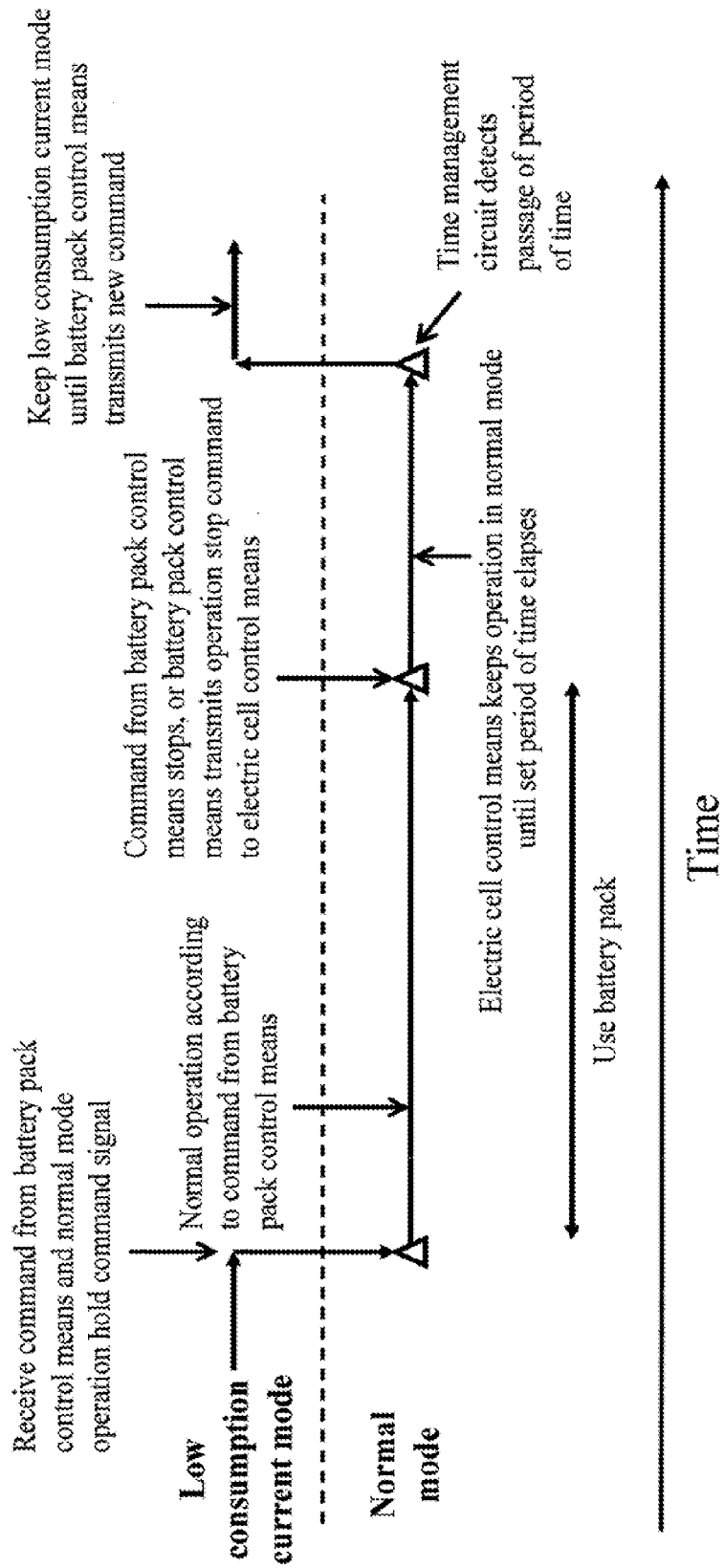
FIG. 3B is an explanatory diagram of the operation in the electric cell control means of the present invention.

An example of different operations of the time management circuit 127 and the control circuit 128 of the electric cell control means 121 will be described by means of FIG. 3B. In the above description, the method for transmitting a normal mode operation hold command signal immediately before the battery pack control means 150 stops the operation has been described. Now, a method for transmitting a normal mode operation hold command signal of the battery pack control means 150 before starting of the electric cell control means 121 will be described.

The electric cell control means 121 shifts from the low consumption current mode to the normal mode according to a command from the battery pack control means 150, and further receives a normal mode operation hold command signal sent from the battery pack control means 150. Note that, as a method for causing the electric cell control means 121 to shift to the normal mode, it is also possible to make reception of a normal mode operation hold command signal a condition for shifting of the electric cell control means 121 to the normal mode. Then, if the battery pack control means 150 keeps issuing commands till a predetermined time elapses, the electric cell control means 121 holds the operation of the time management circuit 127 and performs normal operations such as voltage acquisition or an on/off operation of the bypass switches 123 according to a command from the battery pack control means 150. When a predetermined period of time elapses after a command from the battery pack control means 150 stops (the operation of the battery pack control means 150 stops), or when the electric cell control means 121 receives an operation stop command from the battery pack control means 150, the electric cell control means 121 continues to operate in the normal mode under time control of the time management circuit 127. The time management circuit 127 notifies the control circuit 128 of the passage of the period of time upon detecting the passage of the period of time, and the control circuit 128 sends a command to the power supply circuit 126 to shift the mode to the low consumption current mode. Employing the method of operation described above, the electric cell control means 121 can automatically activate the normal mode operation hold function by the time management circuit 127 after a command from the battery pack control means 150 stops or the battery pack control means 150 sends an operation stop command.

Detailed processing of the battery pack control means 150 in this embodiment will be described hereinafter. The battery pack control means 150 receives measured values of voltages, currents, temperatures, or the like of one or more electric cells 111 or information of the electric cell management means 120 or the vehicle control means 200, and performs detection of states, typically SOCs, of one or more electric cells 111 by using the received information and various information stored in advance.

Figure 4:
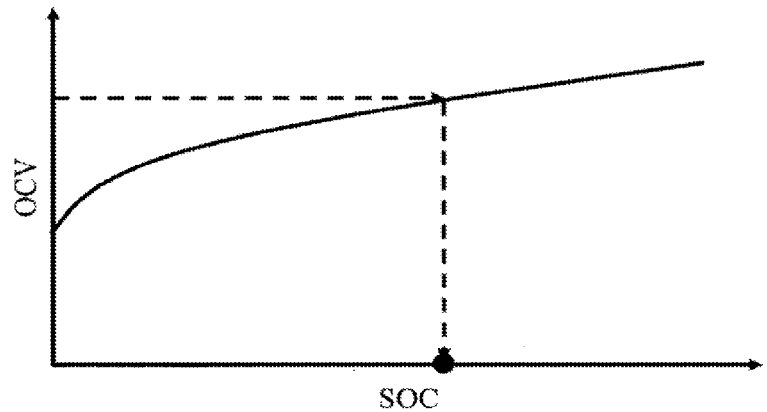
FIG. 4 is a diagram showing a relation of the OCV and SOC of an electric storage means.

FIG. 4 shows a relation of the OCV and SOC of the electric cell 111 in order to describe a method for detection of a SOC to be performed by the battery pack control means 150. An OCV is a voltage observed when no load is given to the electric cell 111. Typical examples of OCV acquisition timing include before the closure of the relays 300, 310, 320, 330, in a situation where the battery pack 110 is not charged or discharged even after the relays 300, 310, 320, 333 are closed, or after charging of the battery pack 110 with the charger 420, and the like. Furthermore, if the battery pack 110 is being charged or discharged but a current value thereof is weak, a voltage of the electric cell 111 can be treated as OCV. By using the OCV of the electric cell 111 detected by the electric cell control means 121 and the correlation shown in FIG. 4, the battery pack control means 150 can immediately obtain the SOC of each electric cell 111.

A description will be given below of the flow of processing performed when the battery pack 110 is charged by the motor generator 410 or the charger 420 and the SOC of the battery pack 110 exceeds a target SOC of control (or upper limit SOC in use of the electric cell). The target SOC is set in consideration of the life of the battery pack 110, use of the battery pack 110 in the system, and the like. If the operation of the battery system 100 formed by the battery pack control means 150, the electric cell management means 120, and the like stops with the SOC exceeding this target SOC, the battery pack 110 will be left with its SOC exceeding the target SOC. In this case, deterioration of each electric cell 111 will be accelerated and inconvenience may occur in some cases even in use of the battery pack 110 after the system is started next time.

Figure 5:
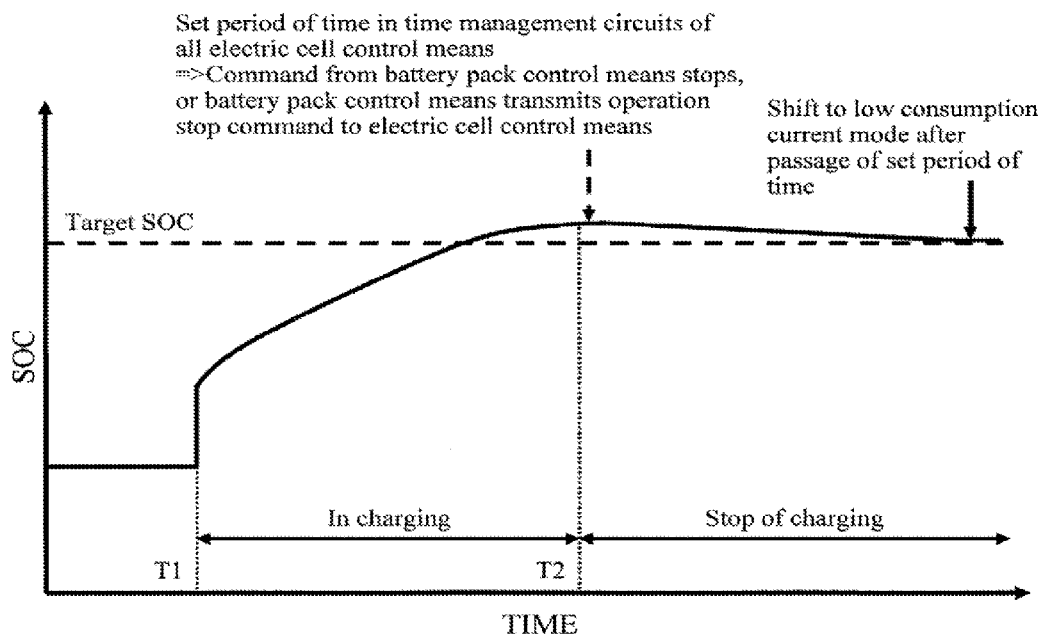
FIG. 5 is a diagram showing an effect of a time management circuit included in the electric cell control means in the first embodiment of the present invention.

FIG. 5 shows the operation of the electric cell control means 121 in the present invention observed when charging exceeding the target SOC mentioned above is performed. It shows an example in which at time T1, the motor generator 410 or the charger 420 starts charging the battery pack 110, and at time T2, the charging is stopped with the SOC of the battery pack 110 exceeding the target SOC.

If the operation of the battery system 100 stops in the situation of FIG. 5, the life of the battery pack 110 or use of the battery pack 110 in the system mentioned above may be affected. Thus, in the present invention, the battery pack control means 150 acquires, as OCV, a voltage of the electric cell 111 at a time point close to time T2. Since it is assumed that the voltages of the electric cells 111 all have the same value in FIG. 5, it is possible to treat, as the OCV of each electric cell 111, a result of dividing information from the voltage detection means 140 by the number of the electric cells 111, instead of the voltage of the electric cell 111 acquired by the electric cell control means 121. The acquired OCV of the electric cell 111 is converted into a SOC on the basis of the correlation of OCV and SOC in FIG. 4.

The battery pack control means 150 of the present invention calculates a difference between the target SOC and the SOC of the battery pack 110. Then, the battery pack control means 150 calculates the amount of discharge of the battery pack 110 necessary for eliminating the difference, that is to say, for matching the SOC of the battery pack 110 with the target SOC. Then, the battery pack control means 150 sends the electric cell control means 121 a command to set, in the time management circuit 127, a period of time enough to ensure the calculated amount of discharge. The period of time enough to ensure the amount of discharge can be easily calculated if the battery pack control means 150 knows in advance the amount of consumption current of the electric cell control means 121 in the normal mode. Note that, in FIG. 5, since all the electric cells 111 have the same SOC, the same period of time is set in all the time management circuits 127 of all the electric cell control means 121.

The battery pack control means 150 stops its operation after transmitting a normal mode operation hold command signal to all the electric cell control means 121. Each electric cell control means 121 continues to operate in the normal mode during the set period of time, even after the battery pack control means 150 stops the operation. Consequently, since the electric cell control means 121 continues to receive energy supplied from the corresponding electric cell group 112 in the normal mode in which the amount of consumption current is relatively large, the SOC of the electric cell group 112 will fall. As a result, the electric cell control means 121 independently continues to operate even after the battery pack control means 150 stops the operation, and thereby performs SOC management of the battery pack 110 so that the battery pack 110 would not be left with its SOC exceeding the target SOC. Then, after the operation of the electric cell control means 121 in the normal mode is continued for the period of time set in the time management circuit 127 (SOC of the battery pack 110=target SOC), each electric cell control means 121 prevents a further drop of the SOC of the battery pack 110 by shifting to the low consumption current mode.

Figure 6:
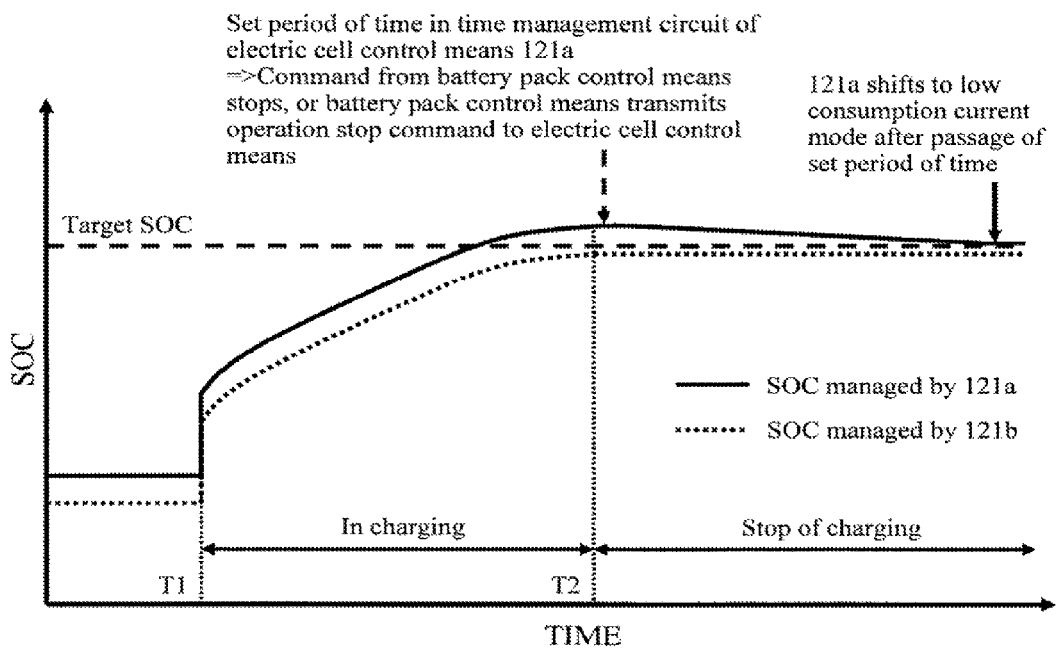
FIG. 6 is a diagram showing an effect of the time management circuit included in the electric cell control means in the first embodiment of the present invention.

FIG. 6 shows an example of a charging operation of the motor generator 410 or the charger 420 observed when a variation in SOC occurs among the electric cell groups 112 being a unit of management of the electric cell control means 121. In this case, only the electric cell group 112a managed by the electric cell control means 121a exceeds the target SOC, and the electric cell group 112b managed by the electric cell control means 121b does not exceed the target SOC. The battery pack control means 150 calculates a difference between the target SOC and the SOC of the electric cell group 112 for every electric cell control means 121, and calculates the amount of discharge of each electric cell group 112 necessary for eliminating the difference with the target SOC (for matching the SOC of each electric cell group 112 with the target SOC). Here, since the electric cell group 112b managed by the electric cell control means 121b has a SOC that already falls below the target SOC, 0 is set in the time management circuit 127 of the electric cell control means 121b, or otherwise, no normal mode operation hold command signal is transmitted to the electric cell control means 121b. On the other hand, since the electric cell group 112a managed by the electric cell control means 121a has a SOC that exceeds the target SOC, a normal mode operation hold command signal which contains a period of time enough to ensure the amount of discharge necessary for solving this is transmitted to the electric cell control means 121a by the battery pack control means 150. When the above operation ends, only the electric cell control means 121a independently continues to operate in the normal mode after the battery pack control means 150 stops its operation. As a result, the electric cell control means 121a avoids being left with its SOC exceeding the target SOC by reducing the SOC of the electric cell group 112a even after the battery pack control means 150 stops the operation.

Note that, the processing of the battery pack control means 150 described above is also applicable to a case in which voltages of the electric cells 111 in the electric cell group 112 managed by each electric cell control means 121 vary. In this case, the battery pack control means 150 calculates a difference between the target SOC and the SOC of the electric cell 111 which has the highest SOC in each electric cell group 112, calculates the amount of discharge necessary for eliminating the difference, and sends each electric cell control means 121a period of time enough to ensure this amount of discharge. This enables the electric cell control means 121 to independently continue to perform management so that the highest SOC in each electric cell group 112 would not be left while exceeding the target SOC, even after the battery pack control means 150 stops the operation.

In this way, with the electric cell control means 121 of the present invention, the electric cell control means 121 can independently perform SOC management even if the battery system 100, mainly formed by the electric cell control means 150, stops its operation with the SOC of the battery pack 110 exceeding the target SOC. Since frequent exchange of information between the battery pack control means 150 and the electric cell control means 121 is not needed either, complicated processing can be avoided while continuous SOC management is achieved.

Figure 7A:
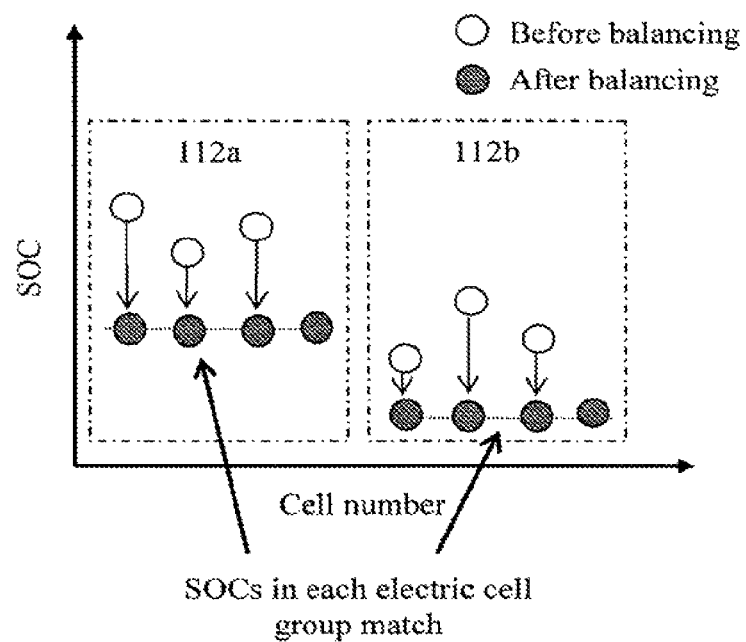
FIG. 7A is a diagram illustrating SOC balancing by bypass resistances and bypass switches.
Figure 7B:
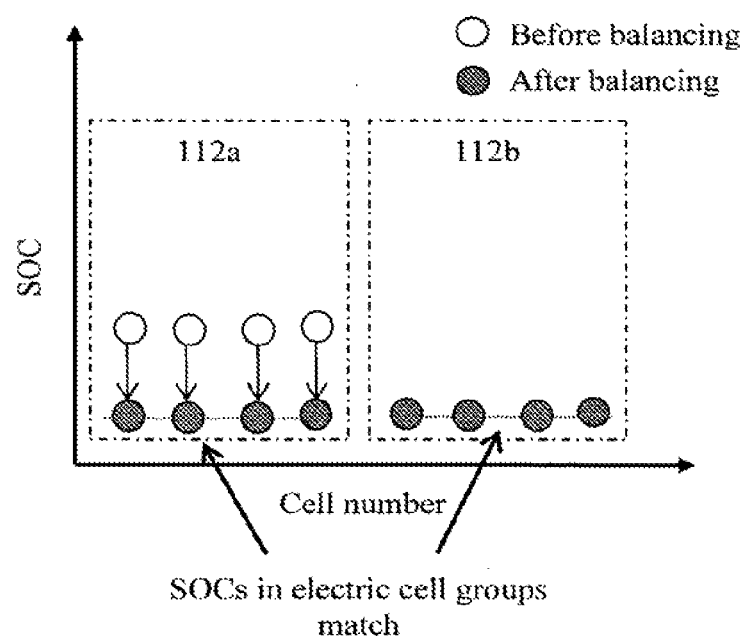
FIG. 7B is a diagram illustrating SOC balancing by a time management circuit.

A method for eliminating SOC variation among the electric cells 111 forming the battery pack 110 with the electric cell control means 121 of the present invention will be described by using FIG. 7A and FIG. 7B. FIG. 7A is a diagram illustrating SOC balancing by the bypass resistances and bypass switches. Further, FIG. 7B is a diagram illustrating SOC balancing by the time management circuit 127.

When a vehicle having the electric storage device for a plug-in hybrid electric vehicle shown in FIG. 1 mounted thereon starts, the battery pack control means 150 is started after the vehicle control means 200 starts, or the vehicle control means 200 and the battery pack control means 150 start independently. When starting of the battery pack control means 150 is completed, the battery pack control means 150 sends the electric cell management means 120 a command to perform starting or the like, and thereby starts the multiple electric cell control means 121 forming the electric cell management means 120.

At this point, the electric cells 111 are in a non-load state unless the relays 300, 310, 320, 330 are closed, and therefore voltages of the electric cells 111 to be transmitted by the electric cell control means 121 to the battery pack control means 150 can be regarded as OCV. Thus, before connection of the relays 300, 310, 320, 330 by the battery pack control means 150 or the vehicle control means 200, the battery pack control means 150 collects, as OCVs, voltages of the electric cells 111 transmitted by the electric cell control means 121, and converts these OCVs into SOCs by using the correlation in FIG. 4. Use of this SOC value for every electric cell 111 enables the battery pack control means 150 to know a level of variation in SOC among the electric cells 111.

Furthermore, when the battery pack 110 is charged by using the charger 420 and a predetermined period of time elapses after the SOC of the battery pack 110 reaches the target SOC, it is also possible to know the level of variation in SOC by detecting voltages of the electric cells 111 acquired by the electric cell control means 121 as OCVs and converting these into SOCs on the basis of the correlation of FIG. 4.

The battery pack control means 150 detects the lowest SOC for every electric cell group 112 being a unit of management of the electric cell control means 121. Then, the battery pack control means 150 causes the electric cell control means 121 to perform discharging of the electric cells 111 in each electric cell group 112 other than the electric cell 111 having the lowest SOC so that the SOC of each of these electric cells 111 can match the lowest SOC, by using the bypass resistances 122 and the bypass switches 123. A period of time during which discharging of each electric cell 111 is performed using the bypass resistances 122 and the bypass switches 123 is set for each of the electric cells 111 other than the electric cell 111 having the lowest SOC, and is determined based on the amount of discharge necessary for balancing to be estimated from a level of deviation from the lowest SOC (SOC target for discharging—the lowest SOC as a reference) and a value of current passing through the bypass resistances, for example. The battery pack control means 150 manages a necessary discharging period of time for each electric cell and transmits a discharging command to ensure the period of time to the electric cell control means 121. Alternatively, a method may be employed in which the control circuit 128 included in the electric cell control means 121 performs management of the discharging periods of time.

By performing the above operation for each electric cell control means 122, it is possible to match SOCs of the electric cells 111 in the electric cell group 112 to be managed by each electric cell control means 121 with one another, as shown in FIG. 7A. The SOC balancing in each electric cell group 112 described above is performed based on the lowest SOC. Alternatively, while a SOC error resulting from a voltage measurement error of the voltage detection circuit 124 included in the electric cell control means 121 is taken as a margin, only a deviation from the lowest SOC beyond the SOC error is taken as a target for discharging. In this way, SOC balancing in each electric cell group 112 may be performed in consideration of a SOC error corresponding to a measurement error.

Further, in the above description, the SOC balancing in each electric cell group 112 is performed based on the lowest SOC. Alternatively, discharging of only the electric cells 111 having a SOC higher than an average SOC may be performed, the average SOC being obtained as a reference from SOCs of all the electric cells 111 in each electric cell group 112. Still alternatively, discharging of only the electric cells 111 having a SOC higher than an average SOC may be performed, the average SOC being obtained as a reference from the highest SOC and the lowest SOC in each electric cell group 112. Still alternatively, in the case of using the above SOC average value, while a SOC error resulting from a voltage measurement error of the voltage detection circuit 124 is taken as a margin, only a deviation from the average SOC beyond the SOC error may be taken as a target for discharging, as in the case of the above description.

Then, the battery pack control means 150 detects the lowest SOC in each electric cell group 112. Since there are two electric cell control means 121, i.e., 121a and 121b, in this embodiment, the battery pack control means 150 uses two lowest SOCs of the respective electric cell control means 121. SOC balancing between the electric cell groups 112 by using the two lowest SOCs will be described hereinafter.

The battery pack control means 150 detects the two lowest SOCs in the respective electric cell control means 121, and calculates a difference between the lowest SOCs. Then, the battery pack control means 150 sends a normal mode operation hold command signal to the electric cell control means 121 managing the electric cell having a higher one of the lowest SOCs to clear the difference between the two lowest SOCs. With this normal mode operation hold command signal, a period of time to be described later is set in the time management circuit 127 included in the electric cell control means 121, and the electric cell control means 121 continues to operate in the normal mode till this period of time elapses. The period of time to be set in the time management circuit 127 is determined by the amount of discharge necessary for eliminating the difference between the lowest SOCs and the amount of consumption current by which the electric cell control means 121 consumes energy stored in the electric cell group 112 in the normal mode. In other words, the period of time means a period of time enough to reduce the SOC of one of the electric cell groups 112 containing a higher one of the lowest SOCs with the consumption current of the corresponding electric cell control means 121 so as to match it with the lowest SOC contained in another electric cell group 112.

Note that, during charging or discharging of the battery pack 110, all the electric cell control means 121 need to operate to monitor state of all the electric cells 111. Thus, the continuous operation of some of the electric cell control means 121 in the normal mode based on the normal mode operation hold command signal is performed only under the condition which guarantees that charging or discharging of the battery pack 111 is not performed, such as when the overall operation of the battery system 100 is stopped. The battery pack control means 150 and the like in the battery system 100 stop the operation, and only a target electric cell control means 121 (having the lowest SOC in the corresponding electric cell group 112 larger than the lowest SOC in the other electric cell group) continues to operate in the normal mode to consume energy stored in the target electric cell group 112 to be managed. Consequently, the SOC of the electric cell group 112 having a higher one of the lowest SOCs is reduced, and thereby the lowest SOCs between the electric cell groups 112 match. As soon as the period of time needed to match the lowest SOC in each electric cell group 112 with the lowest SOC, which is the lowest, in the electric cell group 112 serving as a reference elapses, the electric cell control means 121 sequentially shift from the normal mode to the lowest consumption current mode. With the operation described above, and through a combined used of the discharging process of each of the electric cells 111 using the bypass resistances 122 and the bypass switches 123, SOC balancing that can match SOCs of all the electric cells 111 forming the battery pack 110 can be realized.

The aforementioned SOC balancing control between the electric cell groups 112 using the time management circuit 127 included in the electric cell control means 121 is controlled to clear the detected difference between the lowest SOCs in the electric cell groups 112. Alternatively, a method may be employed in which, while a SOC detection error resulting from a voltage measurement error of the voltage detection circuit 124 included in the electric cell control means 121 is taken as a margin, balancing is performed to eliminate only a deviation of SOC beyond the SOC detection error when a difference in the lowest SOCs which exceeds the SOC detection error occurs. Furthermore, instead of the method for matching the lowest SOCs between the electric cell groups 112, a method for matching SOC average values of all the electric cells 111 in the electric cell groups 112 may be employed, or otherwise, a method for matching, between the electric cell groups 112, average SOCs calculated by using the highest SOC and the lowest SOC in each electric cell group 112 may be employed. Otherwise, it is also possible to employ a method for matching the highest SOCs between the electric cell groups 112.

With the above methods, use of the electric cell control means 121 of the present invention makes it possible to prevent the battery pack 10 from being left after charging in a state exceeding the target SOC, even after the battery system 100 stops. In addition, by setting different periods of time in the time management circuits 127 included in the electric cell control means 121 respectively according to SOCs of the electric cell groups 112, even when only a part of the electric cell groups 112 exceeds the charging target SOC, it is possible to individually prevent the electric cell groups 112 from being left while exceeding the target SOC. Furthermore, use of the electric cell control means 121 in combination with the bypass resistances 122 and the bypass switches 123 enables SOC balancing of the entire electric cells 111 forming the battery pack 110.

According to this embodiment, it is possible to provide a battery control circuit capable of achieving SOC management of the electric cells 111 after stop of the operation of the battery system 100, with a simple circuit and control.

Embodiment 2

Figure 8:
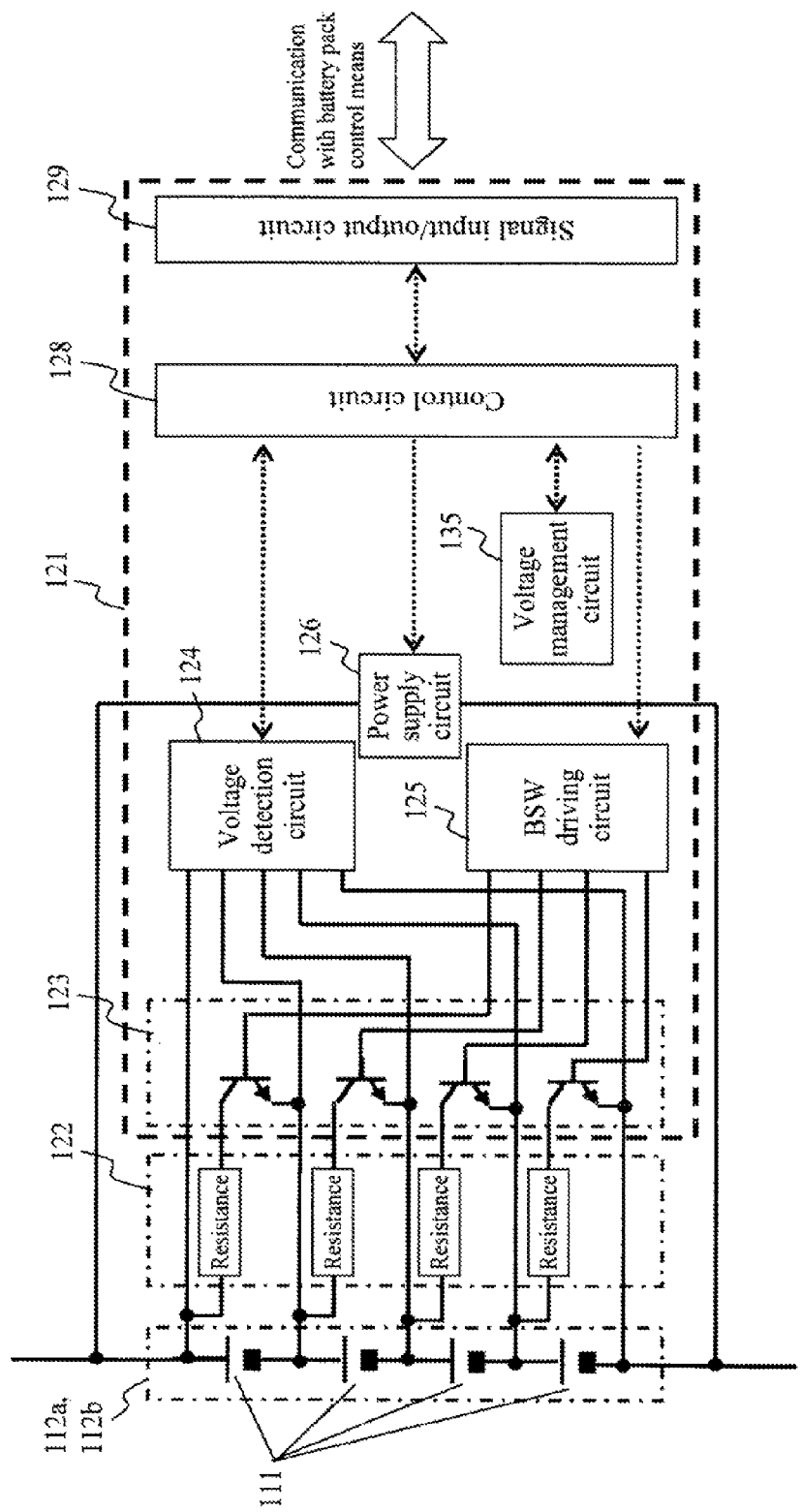
FIG. 8 is a block diagram showing a circuit configuration of an electric cell control means in a second embodiment of the present invention.

An embodiment of a battery control circuit including a voltage management circuit 135 instead of the time management circuit 127 of FIG. 2 shown in Embodiment 1 will be described by means of FIG. 8. As other functions are similar to those of FIG. 2, description of detailed processing thereof will be omitted.

An electric cell control means 121 in this embodiment includes a voltage management circuit 135. The voltage management circuit 135 has a function to store a voltage value contained in a normal mode operation hold command signal to be transmitted from a battery pack control means 150. The voltage management circuit 135 which stores the voltage value receives, through a control circuit 128, information on voltages of electric cells 111 held by a voltage detection circuit 124 included in the electric cell control means 121. When the voltages of the electric cells 111 fall below the voltage value stored in the voltage management circuit 135, the voltage management circuit 135 notifies the control circuit 128 of this. The control circuit 128 transmits a command to a power supply circuit 126 to shift the mode from a normal mode to a low consumption current mode. Alternatively, the voltage management circuit 135 may directly receive the information on the voltages of the electric cells 111 held by the voltage detection circuit 124 included in the electric cell control means 121, instead of receiving through the control circuit 128.

Figure 9:
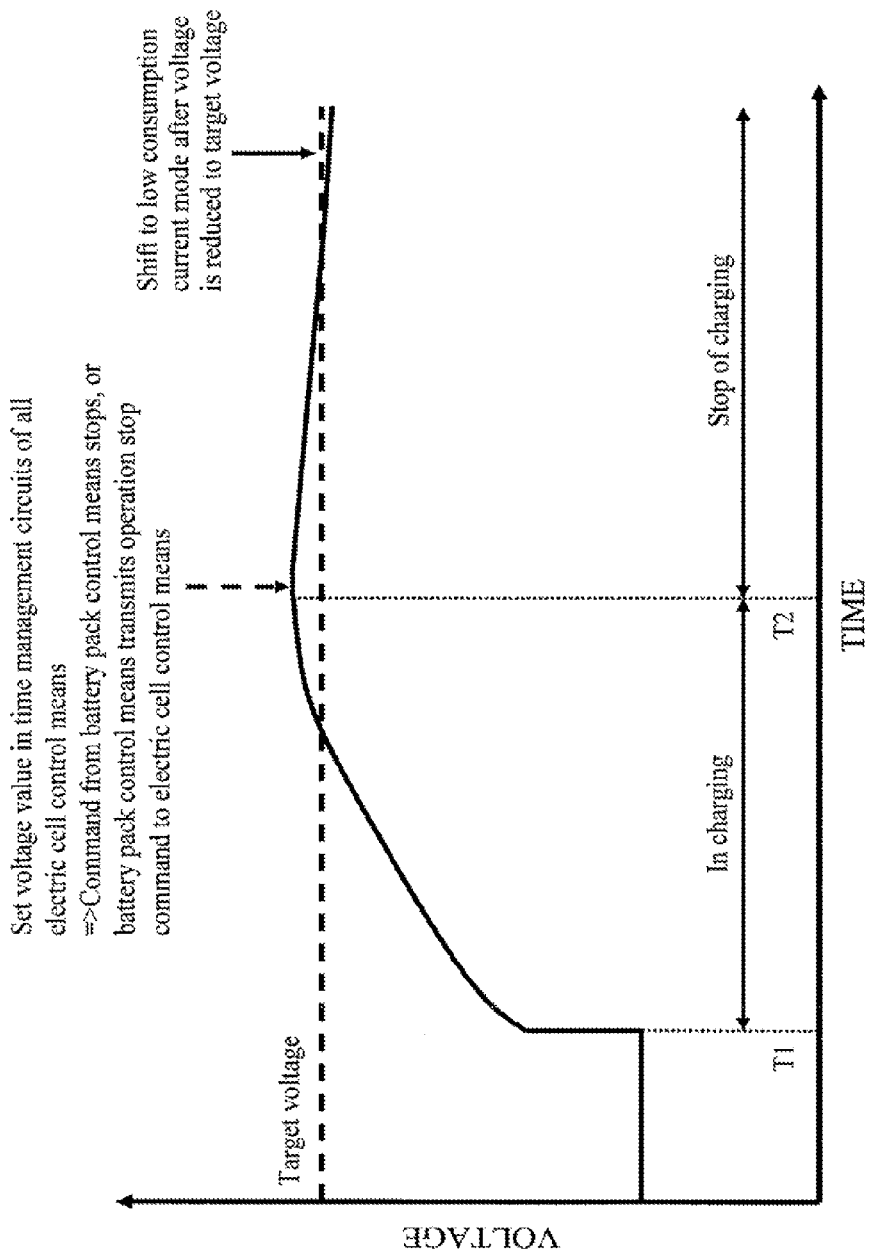
FIG. 9 is a diagram showing an effect of a voltage management circuit included in the electric cell control means in the second embodiment of the present invention.

An example of an operation of the electric cell control means 121 in this embodiment will be described by means of FIG. 9. FIG. 9 shows a case in which charging starts by a motor generator 410 or a charger 420 at time T1, and charging stops at time T2. Further, a description is given of a situation in which there is a target voltage to be set in consideration of the life of the electric cells 111, usage of a battery pack 110, and the like, and an operation of a battery system 100 stops with voltages of the electric cells 111 forming the battery pack 110 exceeding the target voltage.

As shown in FIG. 9, if the electric cells 111 are left for a long period with the voltages thereof exceeding the target voltage which is set in consideration of the life thereof, the life of the electric cells 111 will be affected. Otherwise, if the target voltage is set according to the usage of the battery pack 110 in the system, a trouble may occur next time the battery system 100 is started and the electric cells 111 are used. Thus, the battery pack control means 150 transmits a normal mode operation hold command signal containing a voltage value to the electric cell control means 121. Upon receipt of this, the electric cell control means 121 sets the voltage value in the voltage management circuit 135 included in the electric cell control means itself.

The voltage management circuit 135 included in the electric cell control means 121 in this embodiment causes the electric cell control means 121 to keep operating in the normal mode till a voltage value detected by the voltage detection circuit 124 falls below the voltage value set in the voltage management circuit 135. Then, the voltage management circuit 135 notifies the control circuit 128 when the voltage detected by the voltage detection circuit 124 falls below the voltage value stored in the voltage management circuit 135. Upon receipt of this, the control circuit 128 sends a command to the power supply circuit 126 to shift the mode from the normal mode to the low consumption current mode.

With the aforementioned function to cause the electric cell control means 121 to keep operating in the normal mode, electric energy stored in the corresponding electric cell group 112 is consumed. Then, the consumption of the electric energy stored in the electric cell group 112 results in a reduction in voltage values of the respective electric cells 111, and this also appears in the voltage value detected by the voltage detection circuit 124.

FIG. 9 shows as an example the case in which voltages of the electric cells 111 forming the battery pack 110 all match. Thus, the battery pack control means 150 sends a normal mode operation hold command signal including the same voltage value, in this case, a target voltage to all of the electric cell control means 121 included in the electric cell management means 120. Then, each electric cell control means 122 having received this signal stores the target voltage in the voltage management circuit 135 included in the electric cell control means itself, compares the stored target voltage with a voltage value detected by the voltage detection circuit 124, and continues to operate in the normal mode till the voltage value detected by the voltage detection circuit 124 falls below the target voltage. The above operation enables the voltages of the electric cells 111 to be reduced to a voltage value contained in a normal mode operation hold command signal to be sent from the battery pack control means 150, even when the operation of the battery system 100 is stopped with the voltages of the electric cells 111 forming the battery pack 110 exceeding the target voltage.

Using FIG. 10, a description will be given of an operation of the electric cell control means 121 when there is a difference in voltage between the electric cell groups 112 being a unit of management of the electric cell control means 121. In this case also, the battery pack control means 150 sends a normal mode operation hold command signal containing the same target voltage value to all the electric cell control means 121 included in the electric cell management means 120. Each electric cell control means 121 receives the normal mode operation hold command signal, and store the target voltage in the voltage management circuit 135 included in the electric cell control means itself. Even if the target voltage is set in the voltage management circuit 135 included in the electric cell control means 121b, the voltage management circuit 135 of the electric cell control means 121b immediately detects that a voltage value of the voltage detection circuit 124 falls below the stored target voltage because voltages of the electric cell group 112b to be managed are already below the target voltage, and notifies the control circuit 128 of this detected result. The control circuit 128 sends a command to the power supply circuit 126 to shift the mode from the normal mode to the low consumption current mode. On the other hand, since voltages of the electric cell group 112a managed by the electric cell control means 121a exceed the set target voltage, the electric cell control means 121a continues to operate in the normal mode till the voltages of the electric cell group 112a fall below the target voltage. With the above operation, SOC management can be performed so that the electric cell group 112 would be prevented from being left for a long period with the voltage thereof exceeding the target voltage, even if there is a voltage variation between the electric cell groups 112 and when only a part of the electric cell groups 112 exceeds the target voltage.

In the above description of the operation, a normal mode operation hold command signal is sent even to the electric cell control means 121b whose normal mode operation does not need to be kept by the voltage management circuit 135. However, a method for sending the signal only to the electric cell control means 121a which needs to hold the normal mode operation may be employed. In this case, no target voltage is set in the electric cell control means 121b by the battery pack control means 150. Thus, when no signal is sent from the battery pack control means 150 for a predetermined period of time or when an operation stop command is received from the battery pack control means 150, the control circuit 128 makes a determination to cause the power supply circuit 126 to shift from the normal mode to the low consumption current mode, and sends a command to the power supply circuit 126 to shift it to the low consumption current mode.

Figure 10:
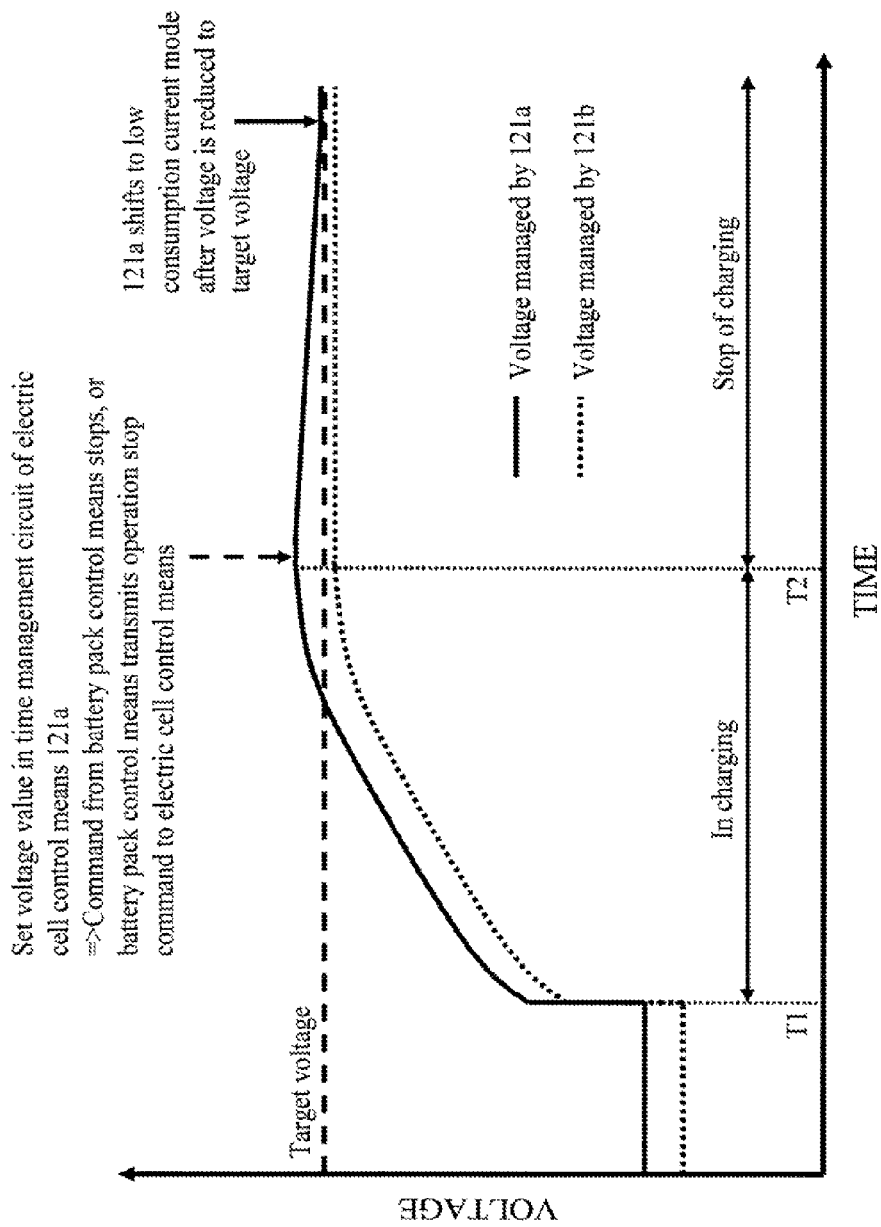
FIG. 10 is a diagram showing an effect of the voltage management circuit included in the electric cell control means in the second embodiment of the present invention.

In addition, in FIG. 9 and FIG. 10, the description is given on the assumption that the voltages of the electric cells 111 in the electric cell groups 112 are the same. However, if the voltages of the electric cells 111 in the electric cell groups 112 vary, it is necessary to add a function to the function of the voltage management circuit 135. Specifically, the voltage management circuit 135 compares the voltage stored in itself with any of the highest voltage, an average voltage, and the lowest voltage of voltages of the multiple electric cells 111 which are detected by the voltage detection circuit 124. In the examples of FIG. 9 and FIG. 10, since the electric cells 111 need to be prevented from being left for a long period with the voltages thereof exceeding the target voltage, the voltage management circuit 135 causes the electric cell control means 121 to continue to operate in the normal mode till the highest voltage of the voltages of the multiple electric cells 111 falls below the target voltage. Which of the highest voltage, the average voltage, or the lowest voltage of the multiple electric cells 111 is set as a target for comparison of the voltage management circuit 135 may be selectable based on a normal mode operation hold command signal to be transmitted by the battery pack control means 150 to the electric cell control means 121. A dedicated signal to make selection among the highest voltage, the average voltage, and the lowest voltage may be provided, or otherwise a signal prepared for any other purpose may contain this selection content.

Provision of the voltage management circuit 135 in the electric cell control means 122 in the above manner allows the electric cell control means 121 to continue to operate in the normal mode till the voltages of the electric cells 111 reach the set voltage. This makes it possible to reduce voltages of the electric cell group 112, which serve as an energy source of the electric cell control means 121, to a desired value.

Furthermore, through a combined use of a function of individually discharging the electric cells 111 using bypass resistances 122 and bypass switches 123, balancing of voltages of the electric cells 111 forming the battery pack 110 can also be achieved, as shown in FIG. 7(a). In the case where the lowest voltage is selected as a reference among three types of voltages, i.e., the lowest voltage, an average voltage, and the highest voltage in order to achieve the effect such as one shown in FIG. 7 when a voltage variation occurs between the electric cell groups 112, the battery pack control means 150 collects information on voltages of the electric cells 111 from the multiple electric cell control means 121, and detects the lowest voltage value. Then, the battery pack control means 150 includes this lowest voltage value and a command to instruct the corresponding voltage management circuit 135 to use the lowest voltage as a comparison target in a normal mode operation hold command signal, and sends the signal to all the electric cell control means 121. The electric cell control means 121 having received this signal stores the lowest voltage and setting to use the lowest voltage as a comparison target in the voltage management circuit 135 included in the electric cell control means itself. If the lowest voltage value of multiple voltage detection values detected by the voltage detection circuit 124 falls below the stored lowest voltage value, the electric cell control means 121 notifies the control circuit 128 of this. In response to this notification, the control circuit 128 sends a command to the power supply circuit 126 to shift the mode from the normal mode to the low consumption current mode, and limits further energy consumption of the corresponding electric cell group 112.

As described above, when it is detected that the electric cells 111 are left with voltages thereof exceeding an upper limit, by the battery pack control means 150 transmitting a normal mode operation hold command signal, the electric cell control means 121 can independently perform voltage management even while the battery pack control means 150 stops the operation. By setting a target voltage in the voltage management circuit 135 included in the electric cell control means 121, energy stored in the corresponding electric cell group 112 can be consumed till any of the highest, lowest, or average voltage of the electric cell group 112 reaches the target voltage. A battery control circuit applicable to voltage balancing of the electric cells 111 forming the battery pack 110 can be provided.

Embodiment 3

Figure 11:
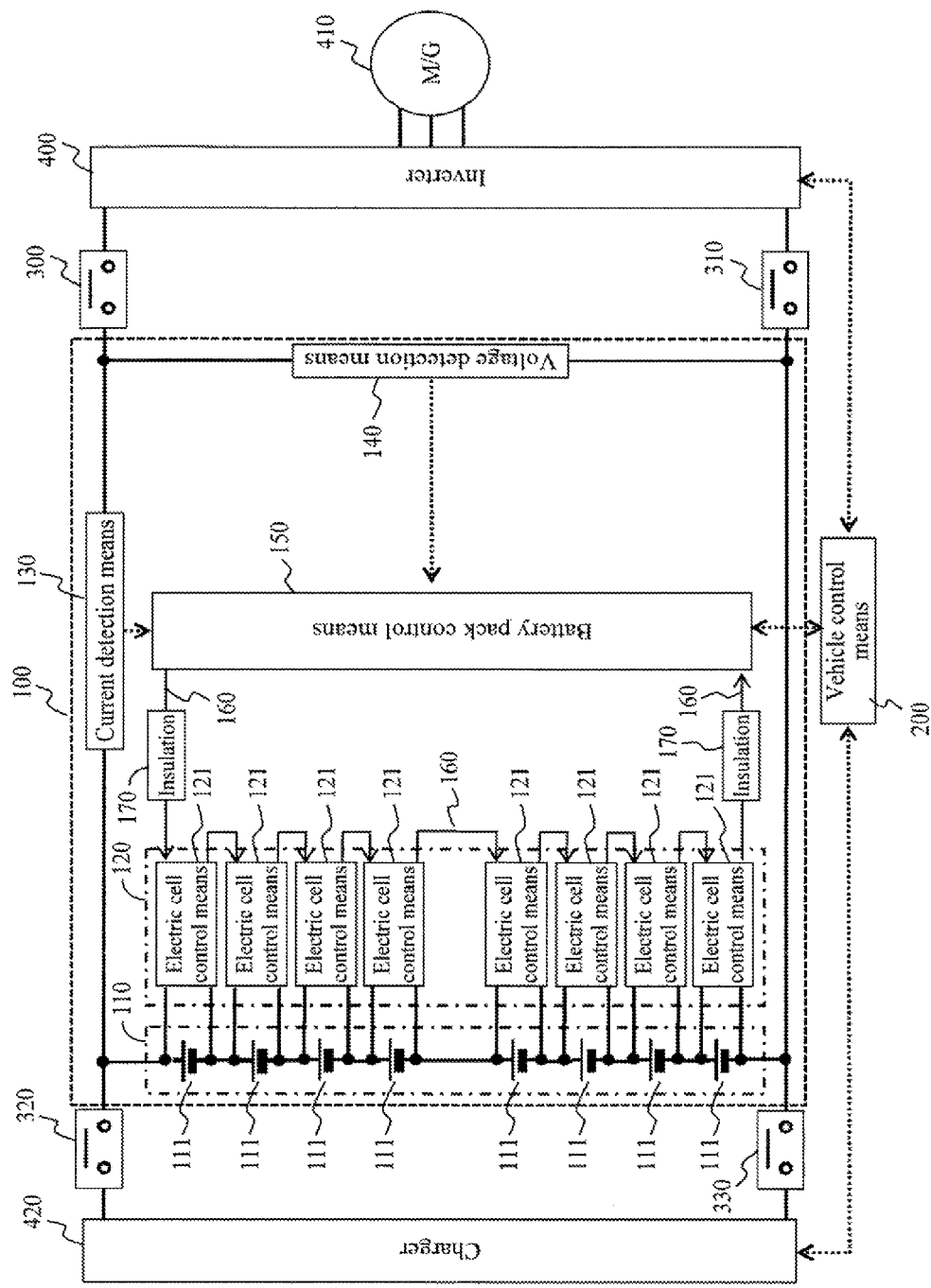
FIG. 11 is a block diagram showing another configuration example of an electric storage device of a plug-in hybrid electric vehicle according to the present invention.

In this embodiment, changes will be made to the overall configuration diagram described in Embodiments 1, 2. FIG. 11 shows a configuration example of an electric storage device of a plug-in hybrid electric vehicle according to this embodiment. In this embodiment, one electric cell control means 121 corresponds to one electric cell 111, and one electric cell control means 121 monitors a state of one electric cell 111. In this embodiment also, eight electric cells 111 form a battery pack 110 as in the case of Embodiment 1.

Figure 12:
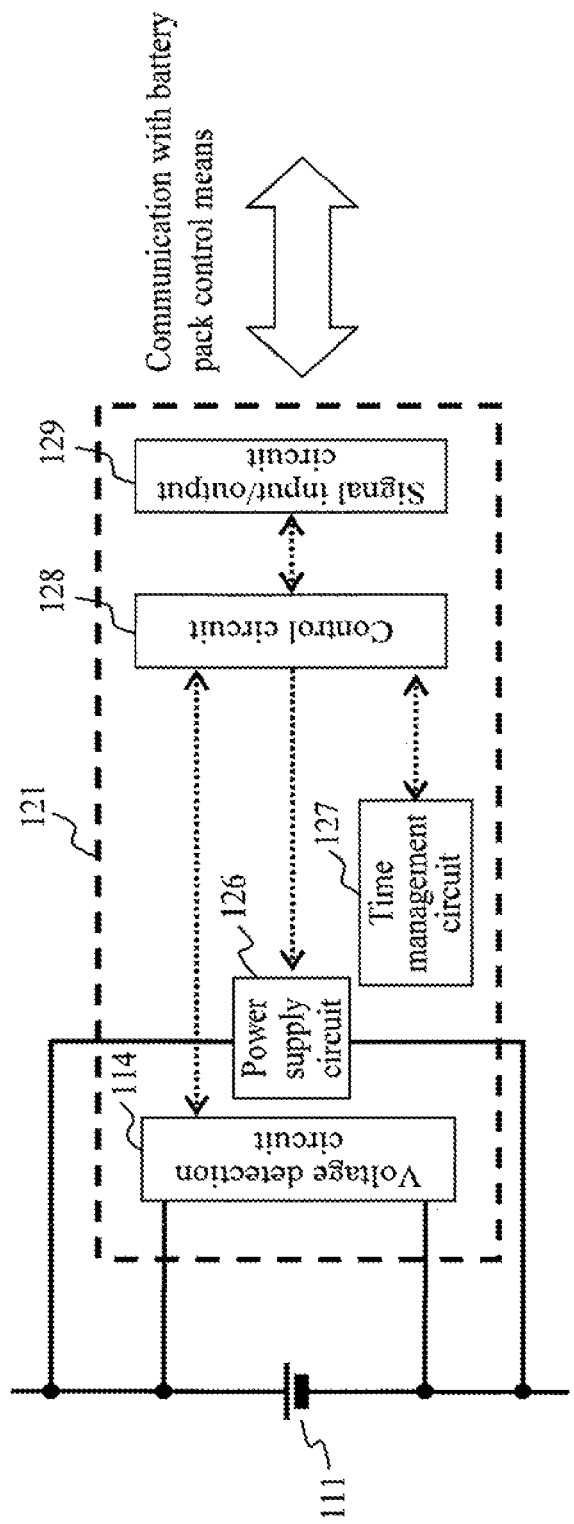
FIG. 12 is a block diagram showing a circuit configuration of an electric cell control means in a third embodiment of the present invention.
Figure 13:
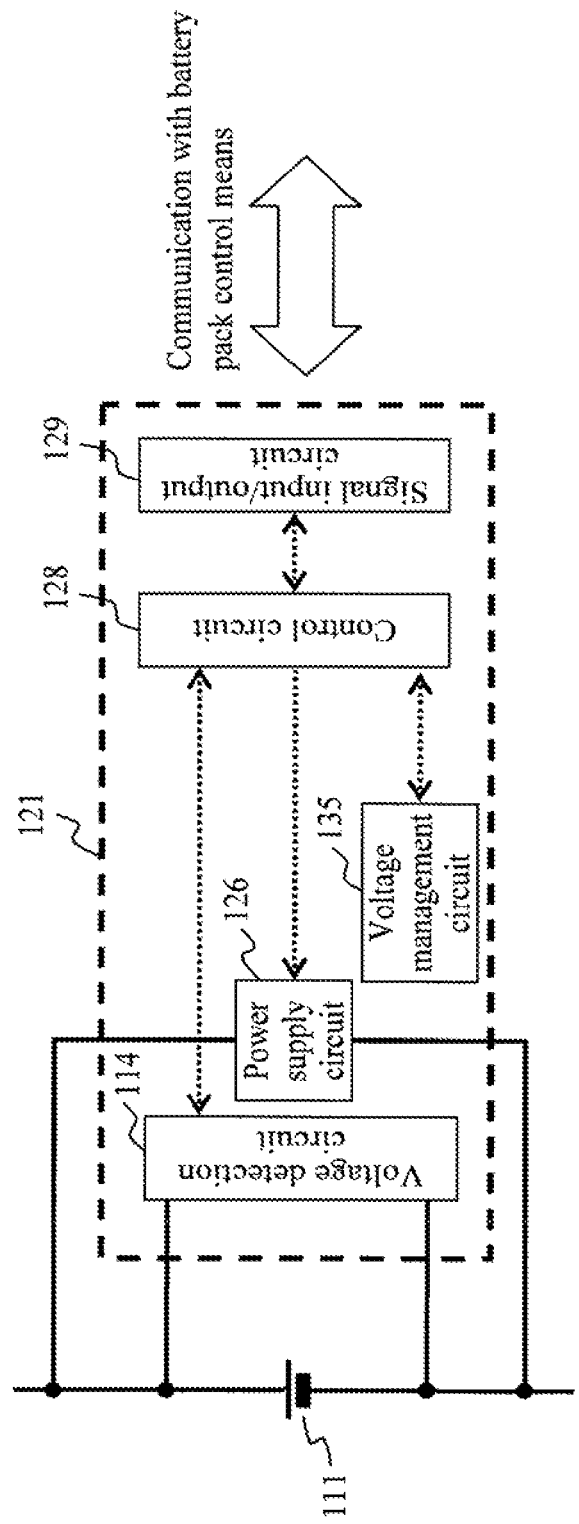
FIG. 13 is a block diagram showing another circuit configuration of the electric cell control means in the third embodiment of the present invention.

FIG. 12 shows a circuit configuration diagram of the electric cell control means 121 in this embodiment. In the case where one electronic cell control means 121 corresponds to one electric cell 111, a configuration may be employed in which the bypass resistances 122, the bypass switches 123, and the BSW driving circuit 125 for driving the bypass switches 123 in FIG. 2 are removed. In addition, even in a configuration in which a voltage management circuit 135 replaces a time management circuit 127 as shown in FIG. 13, the bypass resistances 122, the bypass switches 123, and the BSW driving circuit 125 for driving the bypass switches 123 in FIG. 8 are removed. The reason why the three circuits mentioned above can be removed in this embodiment will be described later.

One example of SOC management of the electric cells 111 with the electric cell control means 121 shown in FIG. 12 will be described. For further simplicity of description, a case in which four electric cells 111 (111a, 111b, 111c, 111d) are used will be described.

Figure 14:
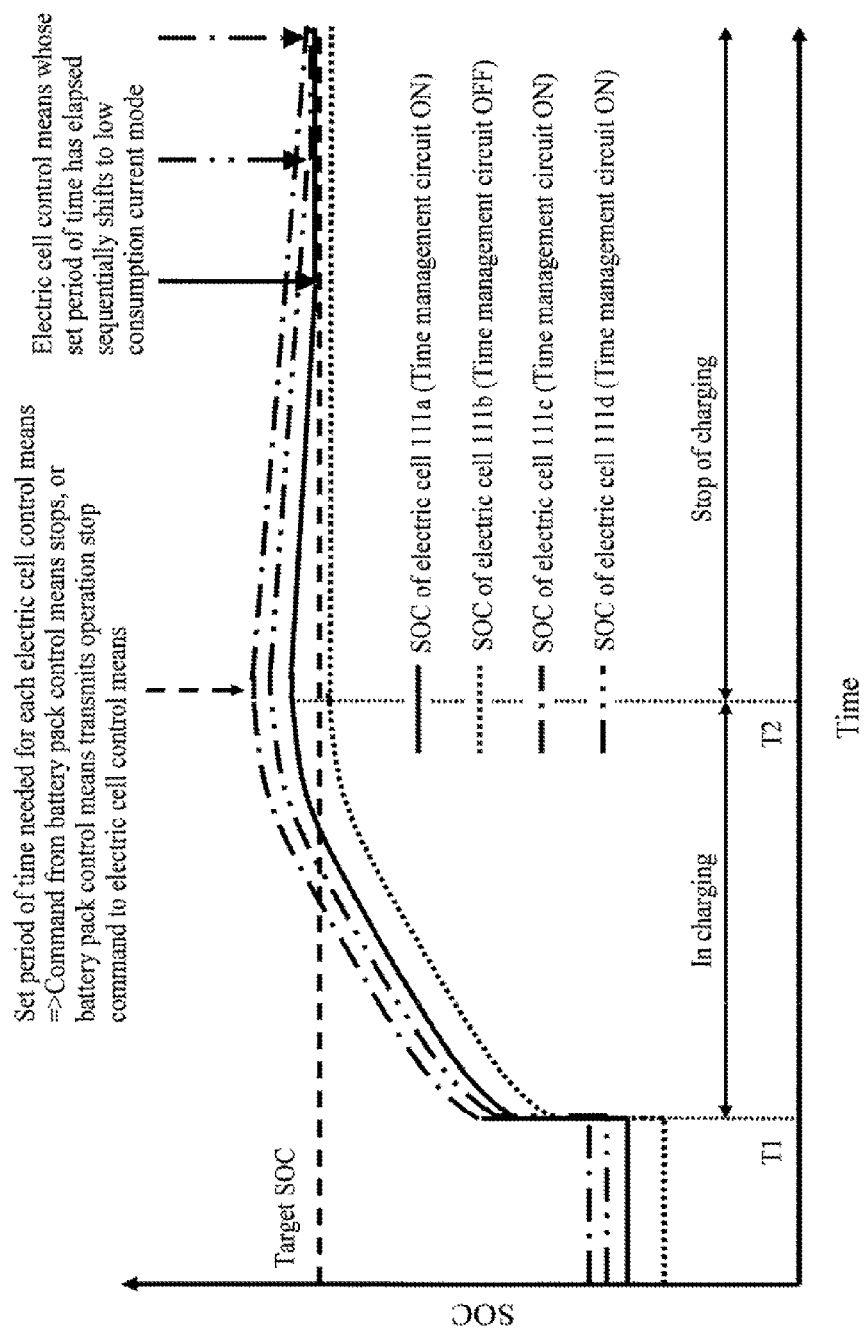
FIG. 14 is a diagram showing an effect of a time management circuit included in the electric cell control means in the third embodiment of the present invention.

A function of the time management circuit 127 included in the electric cell control means 121 of this embodiment shown in FIG. 12 is similar to that described by means of FIG. 2. As shown in FIG. 14, at time T1, charging starts by a motor generator 410 or a charger 420, and at time T2 charging work ends with SOCs exceeding a target SOC at which charging is expected to complete. In addition, in this case, the condition where values of four SOCs of the respective electric cells 111a, 111b, 111c, 111d do not match is used. An operation period in the normal mode enough to consume the amount by which the SOC exceeds the target SOC is stored in each of the time management circuits 127 of the electric cell control means 121 which are provided for the respective electric cells 111. Specifically, the amount of discharge enough to eliminate a difference between the current SOC of each electric cell 111 and the target SOC is calculated, and a period of time enough to consume the amount of electricity stored in excess of the target SOC through the operation of the electric cell control means 121 in the normal mode is calculated by using information on consumption current of the electric cell control means 121 in FIG. 12 in the normal mode. The battery pack control means 150 includes the calculated period of time in a normal mode operation hold command signal and transmits the signal to the electric cell control means 121. By setting the aforementioned period of time for every electric cell control means 121, the electric cell control means 121 can consume the amount of electricity stored in excess of the target SOC through the operation in the normal mode. This makes it possible to keep SOCs of all the electric cells 111 forming the battery pack 110 below the target SOC even after the battery pack control means 150 stops its operation.

The effect similar to FIG. 14 can also be achieved by using the electric cell control means 121 shown in FIG. 13. In the example of FIG. 13, the voltage management circuit 135 is provided instead of the time management circuit 127, and has a function similar to that described in FIG. 8. In the case where the target SOC of FIG. 14 is replaced by a target voltage, a normal mode operation hold command signal for setting the target voltage may be transmitted to the electric cell control means 121 which manages one electric cell 111. The electric cell control means 121 receives the normal mode operation hold command signal which contains the target voltage value transmitted from the battery pack control means 150, sets the target voltage value in the voltage management circuit 135, and continues to operate in the normal mode till the voltage of the electric cell 111 to be managed falls below the target voltage. If the voltage of the electric cell 111 falls below the target voltage set in the voltage management circuit 135, the voltage management circuit 135 detects this, and notifies the control circuit 128 of this detected result. In order to prevent further consumption of energy of the electric cell 111, the control circuit 128 sends a command to the power supply circuit 126 to shift the mode from the normal mode to the low consumption current mode. After the battery pack control means 150 sends the normal mode operation hold command signal, the electric cell control means 121 independently operates even after the operation of the battery pack control means 150 stops, and can perform SOC management so that all the electric cells 111 would not be left with voltages thereof exceeding the target voltage.

A method for balancing SOCs of all the electric cells 111 forming the battery pack 111 will be described. In this embodiment, since the configuration is employed in which one electric cell control means 121 corresponds to one electric cell 111, the SOC or voltage of each of the electronic cells 111 can be adjusted easily and individually by using the function of the time management circuit 127 or the voltage management circuit 135. Accordingly, the bypass resistances 122, the bypass switches 123, and the BSW driving circuit 125, which are needed when multiple electric cells 111 are managed by one electric cell control means 121, can be eliminated in this embodiment.

A method for balancing SOCs of all the electric cells 111 forming the battery pack 110 with the electric cell control means 121 shown in FIG. 12 being used as an example will be described by means of FIG. 15. In the charging or discharging at no load or at a weak current, which can be regarded as at no load, the battery pack control means 150 collects information on voltages of all the electric cells 111 by using the electric cell control means 121, treats this information as OCVs, and obtains SOCs based on the correlation in FIG. 4. The battery pack control means 150 detects the lowest SOC of the SOCs of all the electric cells 111 thus detected, and calculates a difference between the SOC of each electric cell 111 and the lowest SOC. Then, based on information on a current consumed by the electric cell control means 121 of FIG. 12 when it operates in the normal mode, the battery pack control means 150 calculates, for each electric cell 111, an operation period in the normal mode enough to eliminate the difference between the SOC of the electric cell and the lowest SOC, contains that period in a normal mode operation hold command signal, and transmits the signal to the electric cell control means 121 which manages the electric cell 111.

With the aforementioned normal mode operation hold command signal for each electric cell control means 121, a period of time necessary to match the SOC of each electric cell 111 with the lowest SOC serving as a reference can be set in the time management circuit 127 included in the electric cell control means 121. This enables SOCs of all the electric cells 111 forming the battery pack 110 to be adjusted individually, thereby realizing balancing of SOCs of all the electric cells.

In the aforementioned description of the SOC balancing, the case in which the electric cell control means 121 shown in FIG. 12 is used is described as an example. However, SOC (voltage) balancing can be similarly achieved with the electric cell control means 121 shown in FIG. 13. The battery pack control means 150 collects information on voltages of all the electric cells 111 forming the battery pack 110 by using the electric cell control means 121, and detects the lowest voltage among them. The lowest voltage is contained in a normal mode operation hold command signal to be sent by the battery pack control means 150 and the signal is transmitted to all the electric cell control means 121. With the above operation, each electric cell control means 121 stores the lowest voltage in the voltage management circuit 135, and continues to operate in the normal mode till the voltage of the electric cell 111 to be managed reaches the stored lowest voltage. As a result, the voltages of all the electric cells 111 match the set lowest voltage, balancing of voltages of all the electric cells 111 forming the battery pack 110 can be achieved. Note that, in the above description, balancing is performed with the lowest SOC or lowest voltage being used as a reference. Alternatively, an average SOC or average voltage of all the electric cells 111, or an average SOC or average voltage using the highest and lowest values of all the electric cells 111 can be set as a reference. Still alternatively, a voltage derived from multiple detected voltages of electric cells according to a predefined rule can be set as a reference. In addition, a method may be employed in which, while a measurement error of the voltage detection circuit 124 is taken as a margin, balancing is performed only on the amount in excess of this margin.

Embodiment 4

Figure 16:
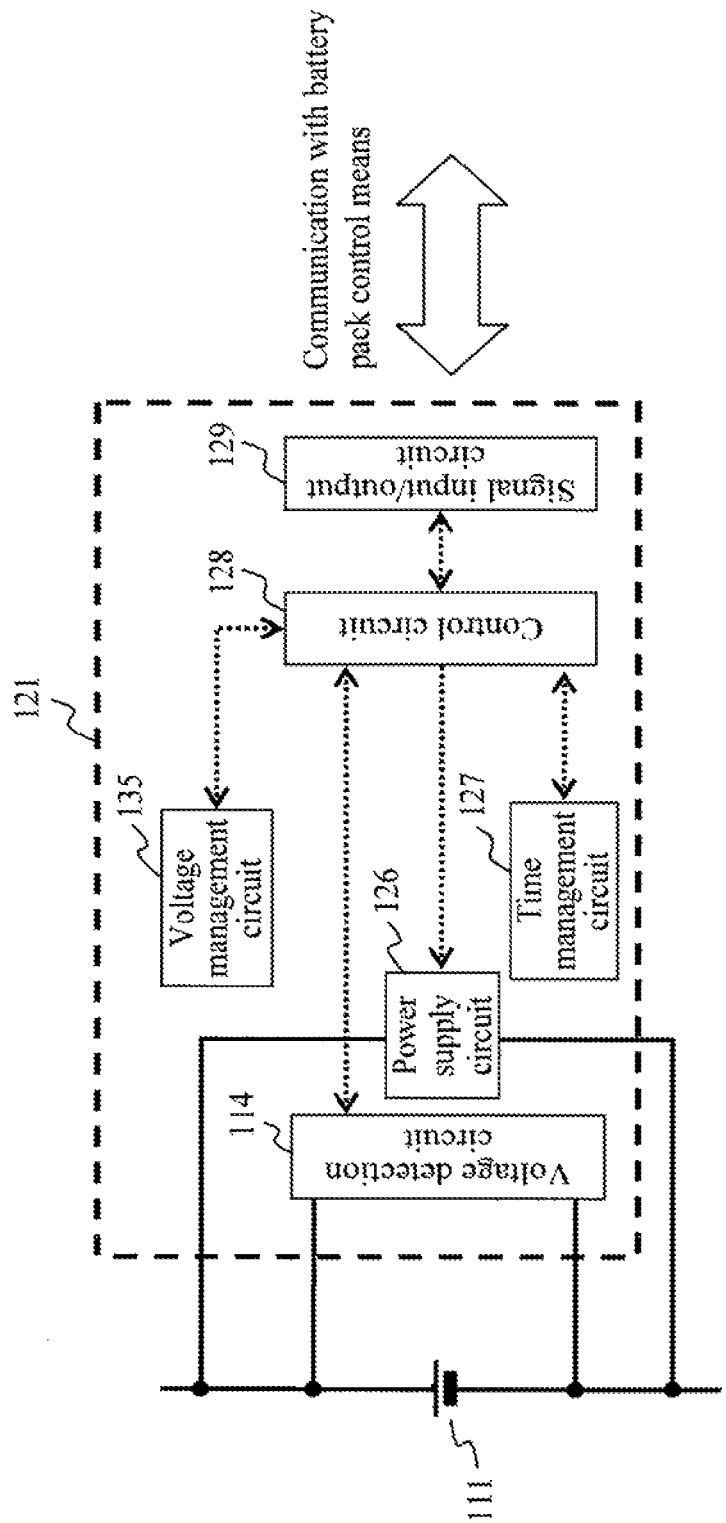
FIG. 16 is a block diagram showing a circuit configuration of an electric cell control means in a fourth embodiment of the present invention.

In this embodiment, changes are made to FIG. 12 and FIG. 13 described in Embodiment 3. As shown in FIG. 16, in this embodiment, one electric cell control means 121 includes both a time management circuit 127 and a voltage management circuit 135. Note that, since the time management circuit 127, the voltage management circuit 135, and other circuits have similar functions to those described above, a detailed description of their processing contents will be omitted.

Figure 17:
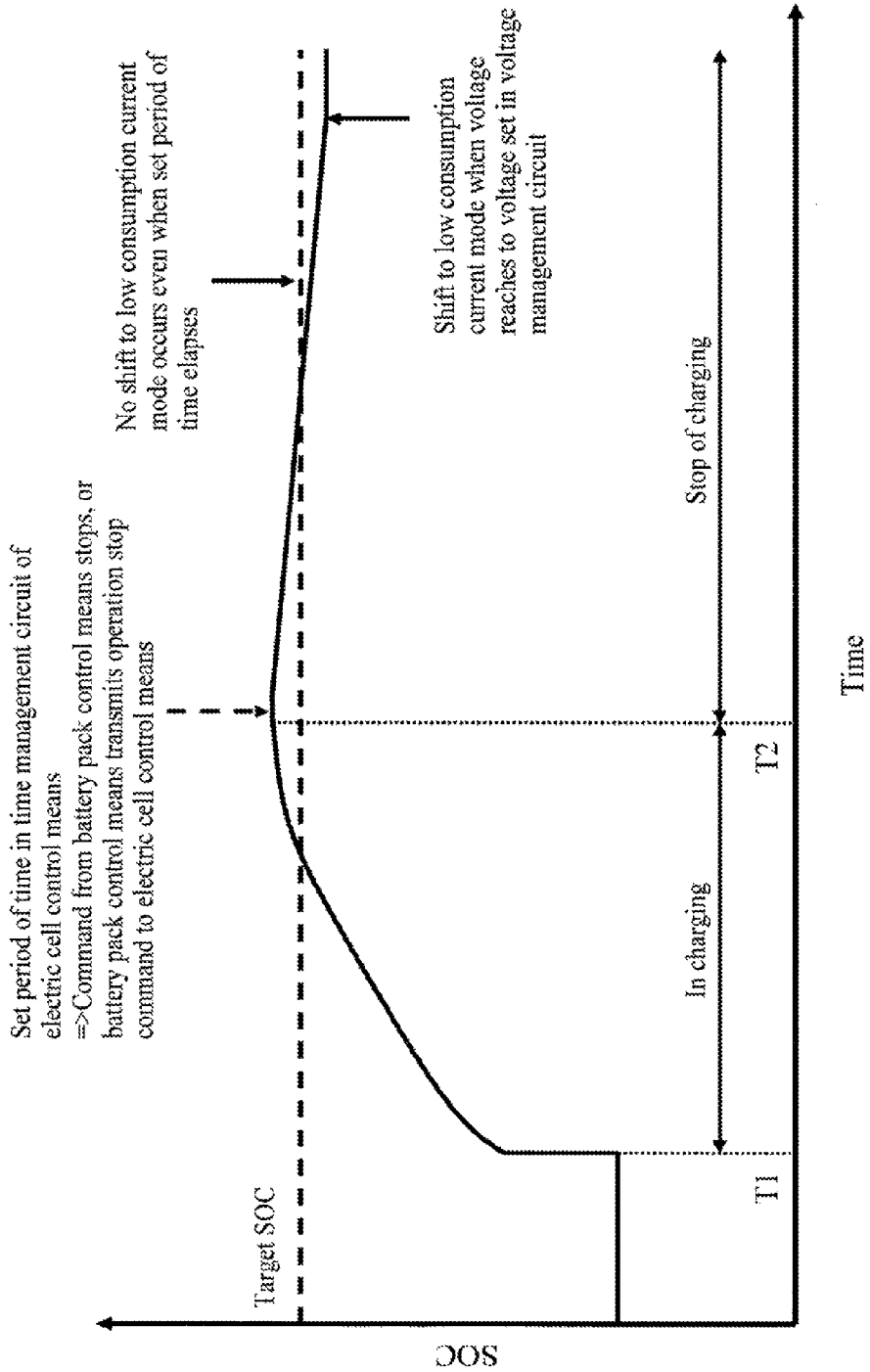
FIG. 17 is a diagram showing effects of a time management circuit and a voltage management circuit included in the electric cell control means in the fourth embodiment of the present invention.

An operation of an electric cell control means 121 in this embodiment will be described by means of FIG. 17. A case in which charging by a motor generator 410 or a charger 420 starts at time T1, and charging ends at time T2 with the SOC exceeding a target SOC is taken as an example. Similarly in this embodiment, if electric cells 111 are charged beyond the target SOC and then an operation of a battery system 100 including a battery pack control means 150 is stopped, inconvenience may occur in the life of the electric cells 111 or usage of a battery pack 110 of the system. In this case, also in this embodiment, by using the time management circuit 127, the amount of electricity stored in excess of the target SOC is consumed by a current consumed when the electric cell control means 121 of FIG. 16 operates in a normal mode.

With a continued operation in the normal mode for a period of time set in the time management circuit 127, the SOC of the electric cell 111 drops. In this event, if the electric cell control means 121 does not shift from the normal mode to a low consumption current mode even though the period of time set in the time management circuit 127 has elapsed, the SOC of the electric cell 111 continues to fall. Otherwise, if a period of time set in a normal mode operation hold command signal to be sent by the battery pack control means 150 is erroneous, the electric cell control means 121 may similarly continue to operate in the normal mode for an excessive period of time. In this case, if a voltage value is set in the voltage management circuit 135 other than the time management circuit 127, it is possible to cause the electric cell control means 121 to shift from the normal mode to the low consumption current mode by causing the voltage management circuit 135 to detect that the voltage of the electric cell 111 has reached the set voltage value.

As the voltage value to be set in the voltage management circuit 135, a method for setting a lower limit voltage in use of the electric cells 111, an OCV value corresponding to 0% SOC, or an OCV value corresponding to the lowest SOC in use of the electric cells 111 in the system may be employed. Otherwise, the voltage value may be an OCV value which corresponds to any SOC value which should not fall in a period of time set in the time management circuit 127. Furthermore, although this embodiment employs the configuration in which the SOC of the electric cell 111 is reduced by the time management circuit 127 and excessive discharging of the electric cell 111 by the time management circuit 127 is stopped by the voltage management circuit 135, a method for discharging the electric cells 111 to the set voltage by the voltage management circuit 135 and stopping discharging by the time management circuit 127 if excessive discharging occurs may be employed. In this case, a period of time which should not elapse before the voltage reaches the set voltage is set in the time management circuit 127. If the set period of time elapses, this is notified to the control circuit 128. In response to this notification, the control circuit 128 sends a command to the power supply circuit 126 to shift the mode from the normal mode to the low consumption current mode.

In addition, in the above description, a combination of the time management circuit 127 and the voltage management circuit 135 is provided in the electric cell control means 121. Alternatively, a configuration including two time management circuits 127 or two voltage management circuits 135 may be employed. If two time management circuits 127 are provided, a period of time necessary for reducing the SOC of each electric cell 111 is set in one of the time management circuits 127, while a period of time exceeding this period of time is set in the other. When two voltage management circuits 135 are provided, a target voltage value to which the electric cell 111 needs to be reduced is set in one of the voltage management circuits 135, while a voltage value below that value is set in the other. Further, in order to shift to the low consumption current mode in the case where an error occurs in the continuous operation in the normal mode by the time management circuit 127 or the voltage management circuit 135, the period of time or voltage may be set in the other time management circuit or the other voltage management circuit.

With the function of the electric cell control means 121 mentioned above, it is possible to provide a battery control circuit capable of reliably stopping discharging of the electric cell 111 even if the time management circuit 127 or the voltage management circuit 135 is used incorrectly or operates abnormally.

Furthermore, as shown in FIG. 18, this embodiment can improve reliability of balancing of SOCs or voltages using the time management circuit 127 or the voltage management circuit 135 in the configuration where one electric cell control means 121 is provided for one electric cell 111. FIG. 18 shows the example in which processing of reducing the SOC of the electric cell 111 is performed by the time management circuit 127. Should the electric cell 111 whose SOC falls below the target SOC exist (indicating the electric cell in FIG. 18 having failure in balancing), if the voltage management circuit 135 other than the time management circuit 127 exists in the electric cell control means 121 and stores an OCV value corresponding to the lower limit SOC, it is possible to stop discharging of the electric cell 111, whose SOC falls below the target SOC value, at the lower limit SOC by the function of the voltage management circuit 135. Similar effects can also be achieved with the aforementioned combinations using the time management circuit 127 and voltage management circuit 135, the two time management circuits 127, or the two voltage management circuits 135.

By employing the aforementioned combinations of the time management circuit 127 and the voltage management circuit 135, the two time management circuits 127, or the two voltage management circuits 135, it is possible to provide a battery control circuit capable of reliably stopping discharging of the electric cell 111 even if there should be any failure of the electric cell control means 121 or erroneous usage of the electric cell control means 121. Note that, although the case in which one electric cell control means 121 is provided for one electric cell 111 is described in this embodiment, the combinations of the time management circuit 127 and the voltage management circuit 135, the two time management circuits 127, or the two voltage management circuits 135 can be similarly employed in the case of FIG. 2 and FIG. 8 in which one electric cell control means 121 is provided for multiple electric cells 111, and thereby the function of stopping excessive discharging of the electric cells 111 described above can be achieved.

Embodiment 5

Figure 19:
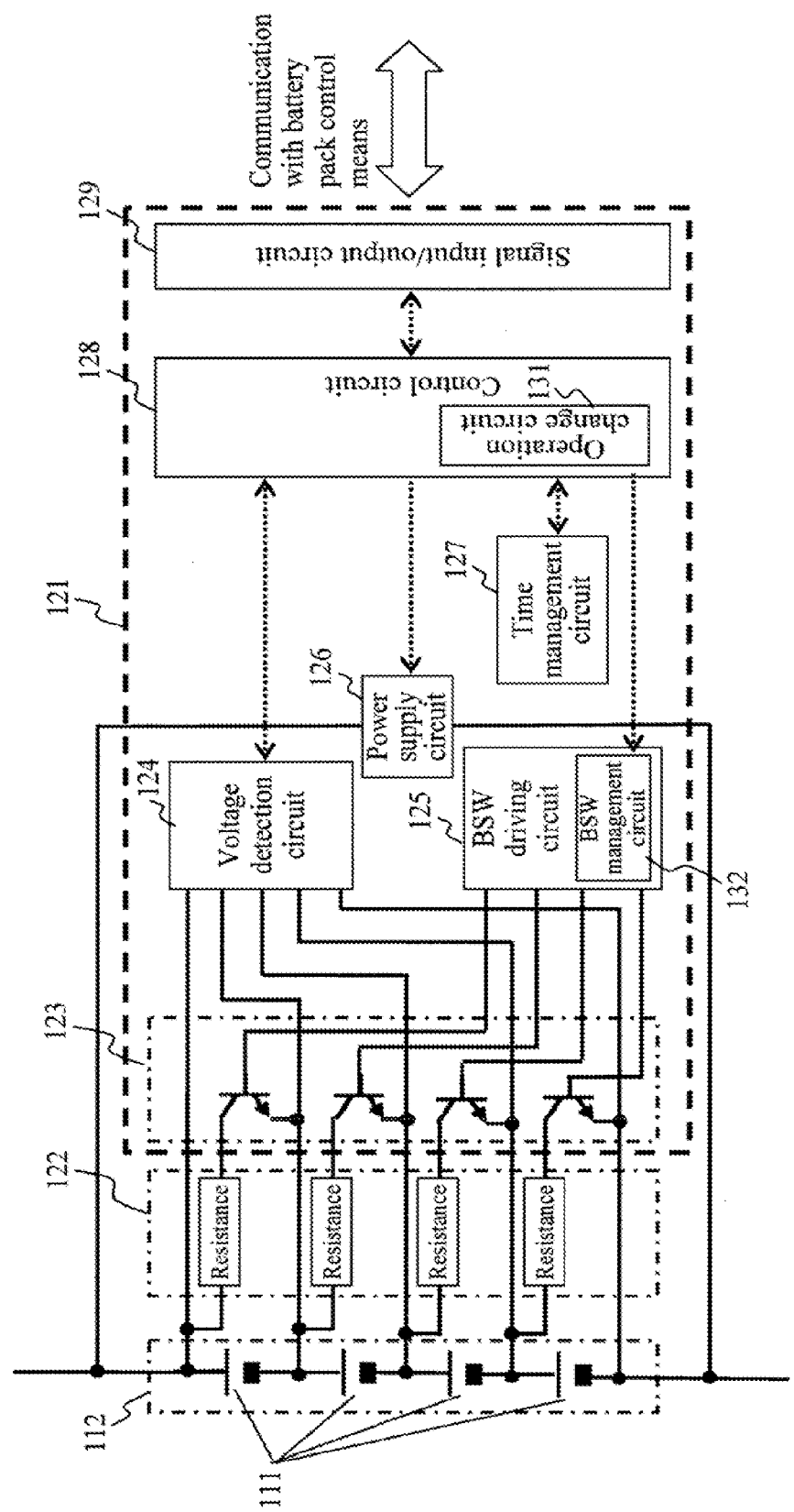
FIG. 19 is a block diagram showing a circuit configuration of an electric cell control means in a fifth embodiment of the present invention.

FIG. 19 shows a circuit configuration of an electric cell control means 121 in this embodiment. The electric cell control means 121 in this embodiment is one in which an operation change circuit 131 is newly added to the control circuit 128 included in the electric cell control means 121 of FIG. 12. In the aforementioned embodiment, the BSW driving circuit 125 operates based on a command from the control circuit 128. In the electric cell control means 121 in this embodiment, a BSW driving circuit 125 can also operate based on a command sent by the operation change circuit 131.

When the electric cell control means 121 in this embodiment receives a normal mode operation hold command signal from the aforementioned battery pack control means 150, it stores time data contained in the normal mode operation hold command signal in a time management circuit 127. When no signal is sent from the battery pack control means 150 for a predetermined period of time or when an operation stop command is received from the battery pack control means 150, the operation change circuit 131 sends the BSW driving circuit 125 a command to turn on all bypass switches 123 or a command to achieve control of the bypass switches 123 enabling balancing of energy consumption using bypass resistances 122 of electric cells 111 to be managed by the electric cell control means 121. Here, the control of the bypass switches 123 enabling balancing of energy consumption using the bypass resistances 122 of the electric cells 111 indicates a method for setting the same period of time during which the bypass switches 123 are turned on, but setting different timings to turn on the respective bypass switches 123, and the like.

Figure 20A:
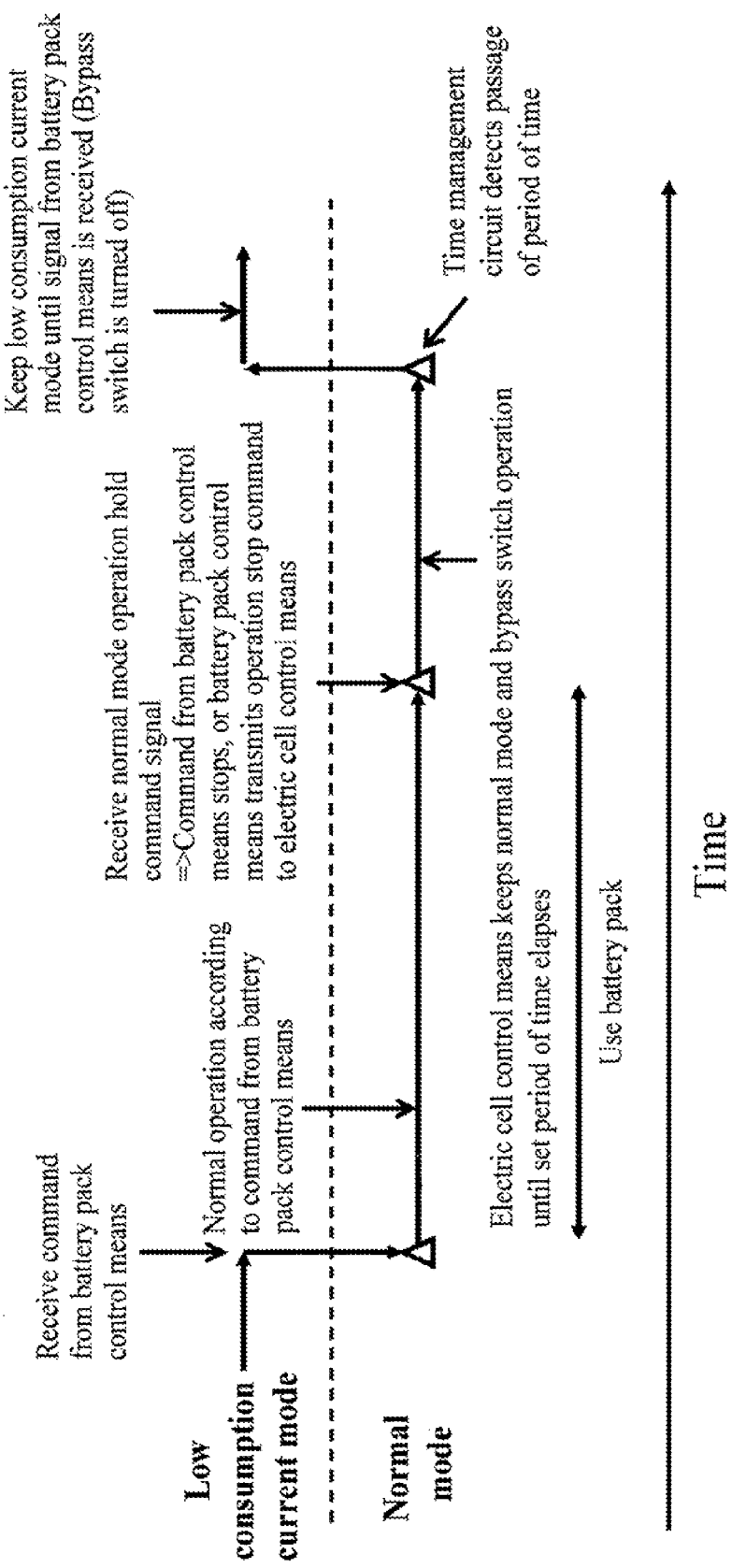
FIG. 20A is a diagram illustrating an operation of the electric cell control means in the fifth embodiment of the present invention.
Figure 20B:
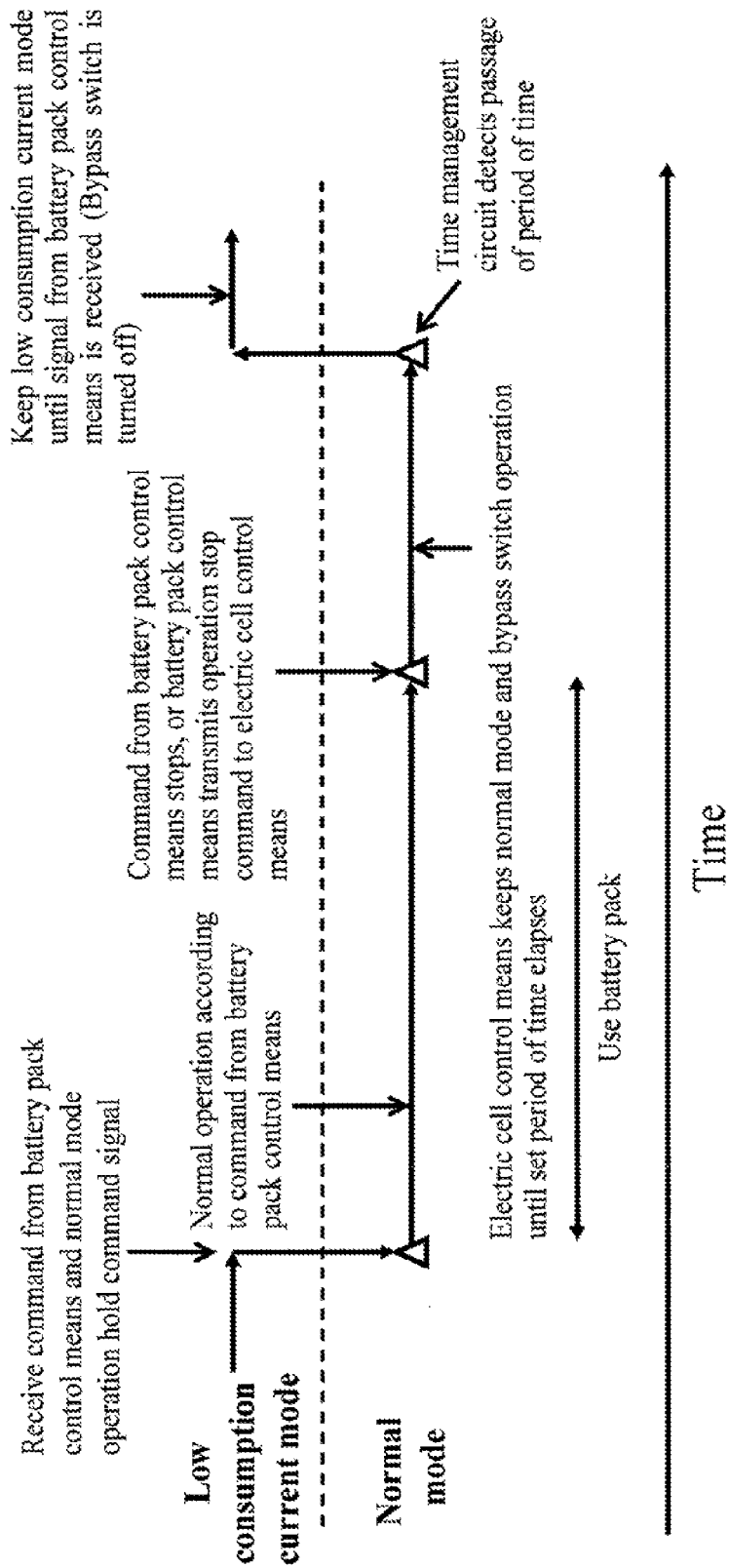
FIG. 20B is a diagram illustrating an operation of the electric cell control means in the fifth embodiment of the present invention.

FIG. 20A and FIG. 20B show flows of operations of the electric cell control means 121 in this embodiment. The electric cell control means 121 can consume part of energy stored in all the electric cells 111 by the bypass resistances 122 during its continuous operation in the normal mode by the time management circuit 127 after reception of the normal mode operation hold command signal. Then, if the time management circuit 127 detects that a period of time set in the time management circuit itself has elapsed, it notifies the control circuit 128 of this detected result. The control circuit 128 sends a command to the power supply circuit 126 to shift the mode from the normal mode to the low consumption current mode. In this event, on state of all the bypass switches 123 or uniform energy consumption of all the electric cells 111 by the bypass resistances 122 mentioned above, which is caused by the operation change circuit 131, is cancelled. Note that, time information to be set in the time management circuit 127 needs to be calculated while including a current consumed by each electric cell 111 when the corresponding bypass switch is turned on, in addition to a current consumed by the electric cell control means 121.

In the aforementioned continuous operation in the normal mode performed after the period of time is set in the time management circuit 127, the bypass switches 123 can be turned on by the operation change circuit 131 sending a command to the BSW driving circuit 125, thereby increasing the consumption current of the electric cell control means 121. As this means that a current to be consumed by electric cell groups 112 increases, it is effective when SOCs of the electric cell groups 122 need to be reduced in a short period of time.

Note that, a BSW management circuit 132 is also provided in the BSW driving circuit 125 included in the electric cell control means 121 in this embodiment. The BSW management circuit 132 has a function to set a period of time during which on state of each bypass switch 123 is kept.

The battery pack control means 150 collects voltages (OCVs) of all the electric cells 111 by using the electric cell control means 121, and converts them into SOCs on the basis of the correlation in FIG. 4. Then, by using, as a reference, the lowest SOC of all the electric cells 111, an average SOC obtained from all the electric cells 111, an average SOC calculated based on the highest SOC and the lowest SOC of all the electric cells 111, or the like, the electric cell higher than the reference is selected as a target for discharging by the bypass resistances 122 and the bypass switches 123. Then, based on a level of deviation from the reference SOC and a resistance value of the bypass resistances 122, a period of time during which the bypass switches 123 need to be turned on to eliminate the deviation from the reference SOC is calculated. The battery pack control means 150 contains the period of time during which the bypass switches 123 need to be turned on in a normal mode operation hold command signal and transmits the signal to the electric cell control means 121. Note that, although the battery pack control means 150 transmits the normal mode hold command signal containing the period of time to the electric cell control means 121 here, a method for providing a different command signal and transmitting the signal to the electric cell control means 121 may be employed.

The electric cell control means 121 continues to operate in the normal mode till the period of time set in the time management circuit 127 elapses. Furthermore, the BSW management circuit 132 has a function to keep the on state of each bypass switch 123 for the set period of time during which the on state of the bypass switch 123 needs to be kept. Then, if the period of time set in the time management circuit 127 elapses before the period of time during which the on state of each bypass switch 123 needs to be kept in the BSW management circuit 132 elapses, the control circuit 128 sends a command to the power supply circuit 126 to shift the mode to the low consumption current mode, and the BSW management circuit 132 also stops its operation at the same time. Thereby, all the bypass switches are turned off.

With the aforementioned function of the BSW management circuit 132 included in the electric cell control means 121, the on state of each bypass switch 123 can be kept as long as necessary without receiving any command from the battery pack control means 150 until the period of time set in the time management circuit 127 elapses. This can eliminate variation in SOC among the electric cell groups 112 and enable balancing of SOCs of the electric cells 111 in each electric cell group 112. Note that, a period of time during which the on state of each bypass switch 123 needs to be kept may be set in the BSW management circuit 132 in a situation in which the electric cell control means 121 continues to receive commands from the battery pack control means 150, such as while the battery pack 110 is charged or discharged. Alternatively, a normal mode operation hold command signal containing the period of time during which each bypass switch 123 needs to be turned on or a different command signal containing the period of time during which each bypass switch 123 needs to be turned on may be transmitted immediately after the electric cell control means 121 starts. With implementation of the BSW management circuit 132, the battery pack control means 150 has only to send once the electric cell control means 121 a period of time during which each bypass switch 123 is turned on even when there is a variation in SOCs of the electric cells 111 in the electric cell group 112. Accordingly, the number of commands to the electric cell control means 121 can be reduced.

In addition, although the electric cell control means 121 of FIG. 19 continues to operate in the normal mode based on the period of time set in the time management circuit 127, the voltage management circuit 135 may be mounted instead of the time management circuit 127. In this case, the electric cell control means 121 sets a voltage value in the voltage management circuit 135, and continues to operate in the normal mode till any of the voltage values selected among the highest voltage, an average voltage, and the lowest voltage of the electric cells 111 to be managed reaches the voltage set in the voltage management circuit 135. Then, when the voltage of the electric cell 111 drops to the voltage set in the voltage management circuit 135, the electric cell control means 121 shifts to the low consumption current mode, and the on state of each bypass switch 123 in accordance with the operation change circuit 131 or the BSW management circuit 132 is changed to off state.

Embodiment 6

Figure 21:
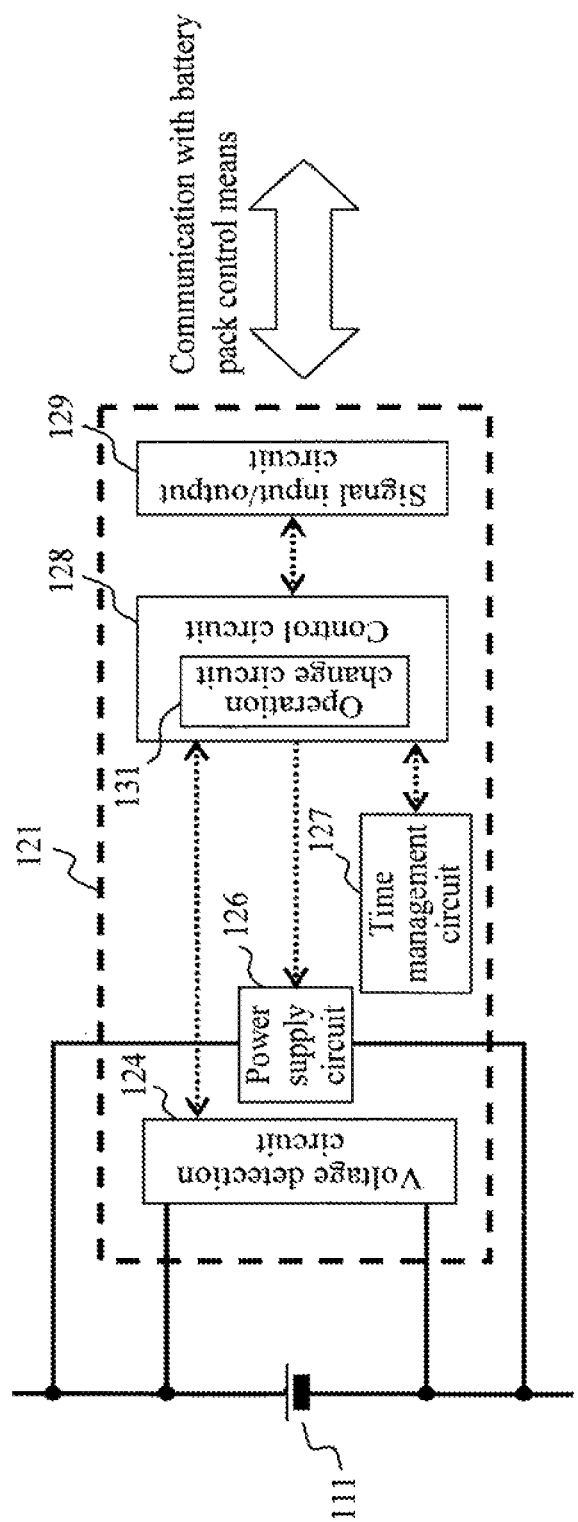
FIG. 21 is a block diagram showing a circuit configuration of an electric cell control means in a sixth embodiment of the present invention.

FIG. 21 shows a circuit configuration of an electric cell control means 121 in this embodiment. In this embodiment, a description will be given taking as an example a configuration in which a change is made to the operation change circuit 131 shown in FIG. 19, and one electric cell control means 121 is provided for one electric cell 111. In addition, a voltage detection circuit 124 described here starts to acquire voltages of the electric cells 111 according to a command from a battery pack control means 150.

An operation change circuit 131 in FIG. 21 changes a mode of operation of the voltage detection circuit 124 while the electric cell control means 121 receives a normal mode operation hold command signal from the battery pack control means 150, sets time information contained in the signal in a time management circuit 127, and continues to operate in the normal mode till the set period of time elapses.

Figure 22A:
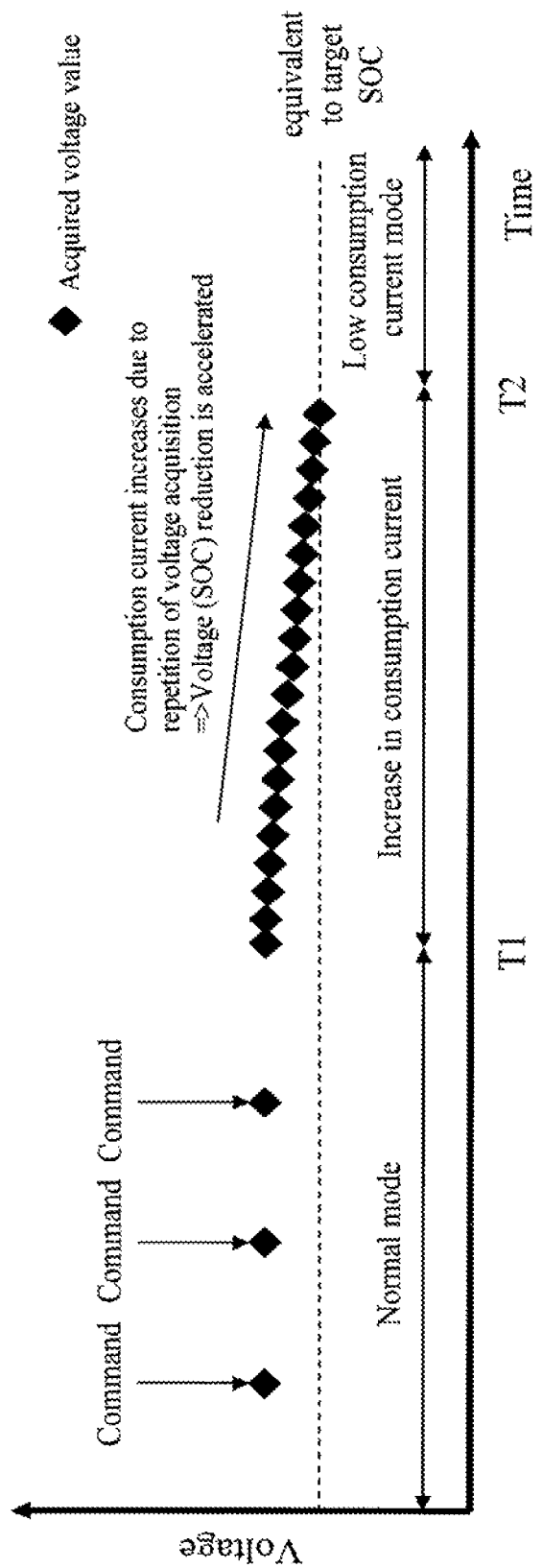
FIG. 22A illustrates an operation of the voltage detection circuit in the sixth embodiment.

An operation of the voltage detection circuit 124 in this embodiment will be described by means of FIG. 22A. In the usual normal mode, as shown in the left part of the figure, the voltage detection circuit 124 detects voltages of the electric cells only when there is a command from the battery pack control means 150 and does not detect voltages if there is no command. In this embodiment, time information is set in the time management circuit 127, and the voltage detection circuit 124 shifts to a mode to continuously detect voltages of the electric cells 111 even if there is no command from the battery pack control means 150 while the electric cell control means 121 continues to operate in the normal mode till the set period of time elapses (T1 to T2). Then, when the period of time set in the time management circuit 127 elapses, the electric cell control means 121 shifts to the low consumption current mode, and the operation of the voltage detection circuit 124 stops together with the shift.

With the aforementioned operation change of the voltage detection circuit 124 according to the operation change circuit 131, a consumption current of the electric cell control means 121 can be increased. Thus, energy consumption of the electric cells 111 to be managed by the electric cell control means 121 can be increased more than usual. Consequently, it is possible to reduce SOCs or voltages of the electric cells 111 in a relatively short period of time. The use of the electric cell control means 121 makes it possible to prevent the electric cells 11 from being left with SOCs thereof exceeding the target SOC as in FIG. 14 in a relatively short period of time. In addition, a period of time needed for balancing of SOCs of all the electric cells 111 using the electric cell control means 121 as in FIG. 15 can also be reduced.

Figure 22B:
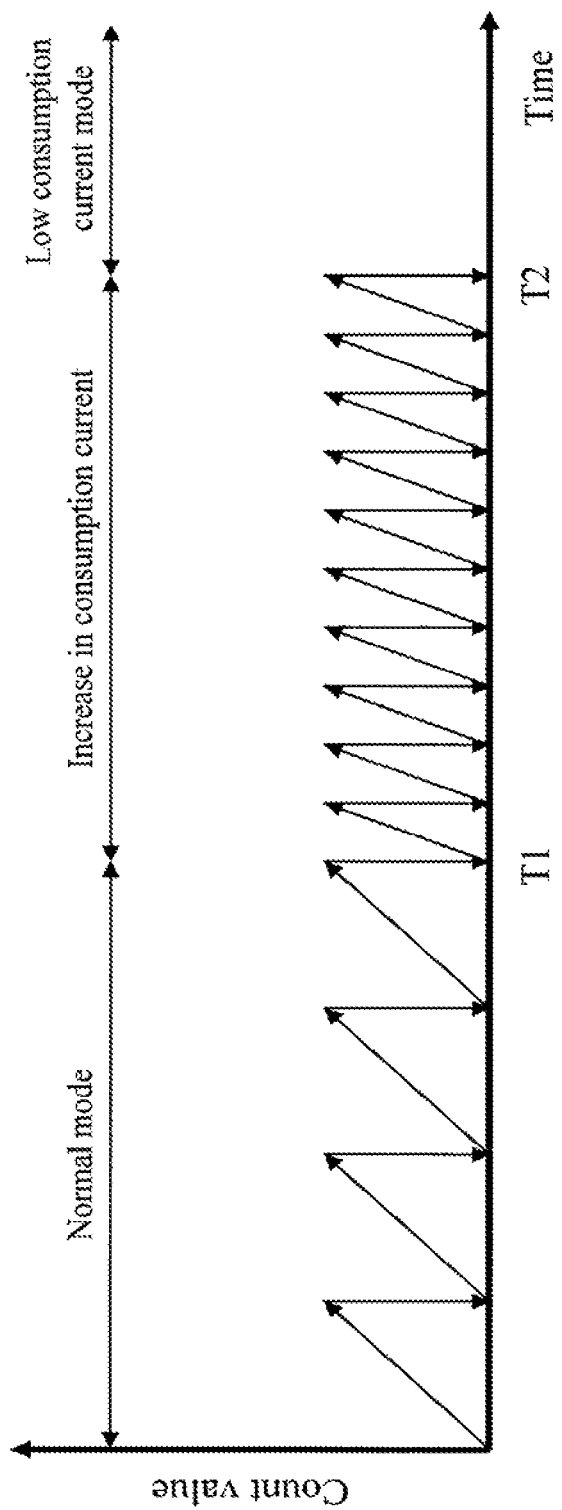
FIG. 22B illustrates the cycle change of the timer included in the electric cell control means of this embodiment.

The operation change circuit 131 included in the electric cell control means 121 in this embodiment may further change a cycle of a timer included in the electric cell control means 121. The cycle change of the timer included in the electric cell control means 121 will be described by means of FIG. 22B. The electric cell control means 122 has one or more timers in order to control a sampling timing of a signal input/output circuit 129, for example. While the electric cell control means 121 continues to operate in the normal mode (T1 to T2)

after a period of time during which the normal mode operation needs to be kept is set in the time management circuit 127 till the period of time set by the time management circuit 127 elapses, the operation change circuit 131 changes the operation cycle of the one or more timers included in the electric cell control means 121. As shown in FIG. 22B, a period of time that the timers count up is shortened due to the change in the timer operation cycle. Thereby, the consumption current of the electric cell control means 121 increases, and the consumption energy of the electric cells 111 to be managed increases. Consequently, reduction of SOCs or voltages of the electric cells 111 is accelerated. This allows reduction in a period of time needed to prevent the electric cells 111 from being left with SOCs thereof exceeding the target SOC in FIG. 14 or to balance SOCs of all the electric cells 111 by using the electric cell control means 121 as in FIG. 15. The method for changing the mode of operation of the voltage detection circuit shown in FIG. 22A and the method for changing the timer operation cycle shown in FIG. 22B can be used in combination. In that case, the SOCs or voltages of the electric cells can be reduced in a shorter period of time.

Note that, although the description is given taking as an example the configuration in which one electric cell control means 121 is provided for one electric cell 111 in this embodiment, a configuration may be employed in which one electric cell control means 121 is provided for multiple electric cells 111. In this case, with the function of the operation change circuit 131 in this embodiment, reduction of SOCs or voltages of the electric cell group 112 to be managed can be accelerated.

Furthermore, although the description is given taking as an example the case where the operation of the electric cell control means 121 in the normal mode is kept by the time management circuit 127 in this embodiment, a method for setting a voltage value in a voltage management circuit 135 and keeping the operation in the normal mode till the voltages of the electric cells 111 drop to the set voltage may also be employed.

With the above, it is possible to provide a battery control circuit capable of preventing the state where SOCs or voltages of the electric cells 111 exceed the target SOC or the target voltage in a relatively short period of time, and reducing a period of time needed to balance SOCs of all the electric cells 111.

Embodiment 7

Figure 23:
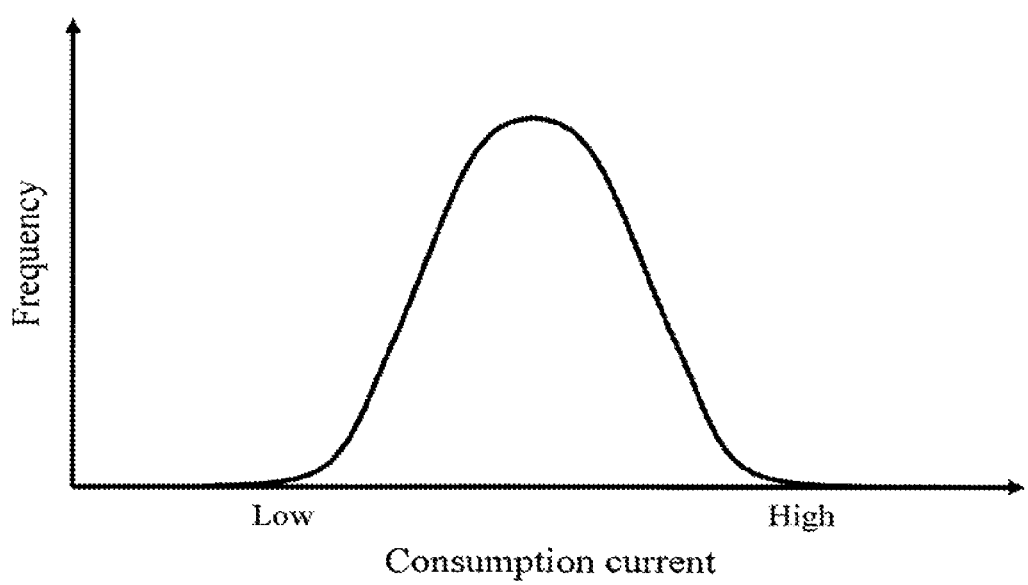
FIG. 23 is a diagram showing an example of distribution of consumption current of an electric cell control means of the present invention.

In this embodiment, attention is paid to a variation in consumption current observed when electric cell control means 121 operate in a normal mode. FIG. 23 shows an example of distribution of the consumption currents of the electric cell control means 121 in the normal mode. Some electric cell control means 121 have small consumption currents, whereas the other electric cell control means 121 have large consumption currents. The electric cell control means 121 perform operation through energy supply from electric cell groups 112 as in FIG. 2 or from electric cells 111 as in FIG. 12. Thus, if the consumption current of the electric cell control means 121 greatly differs from one electric cell control means 121 to another, such difference causes a variation in SOCs of the electric cell groups 112 or the electric cells 111.

Figure 24:
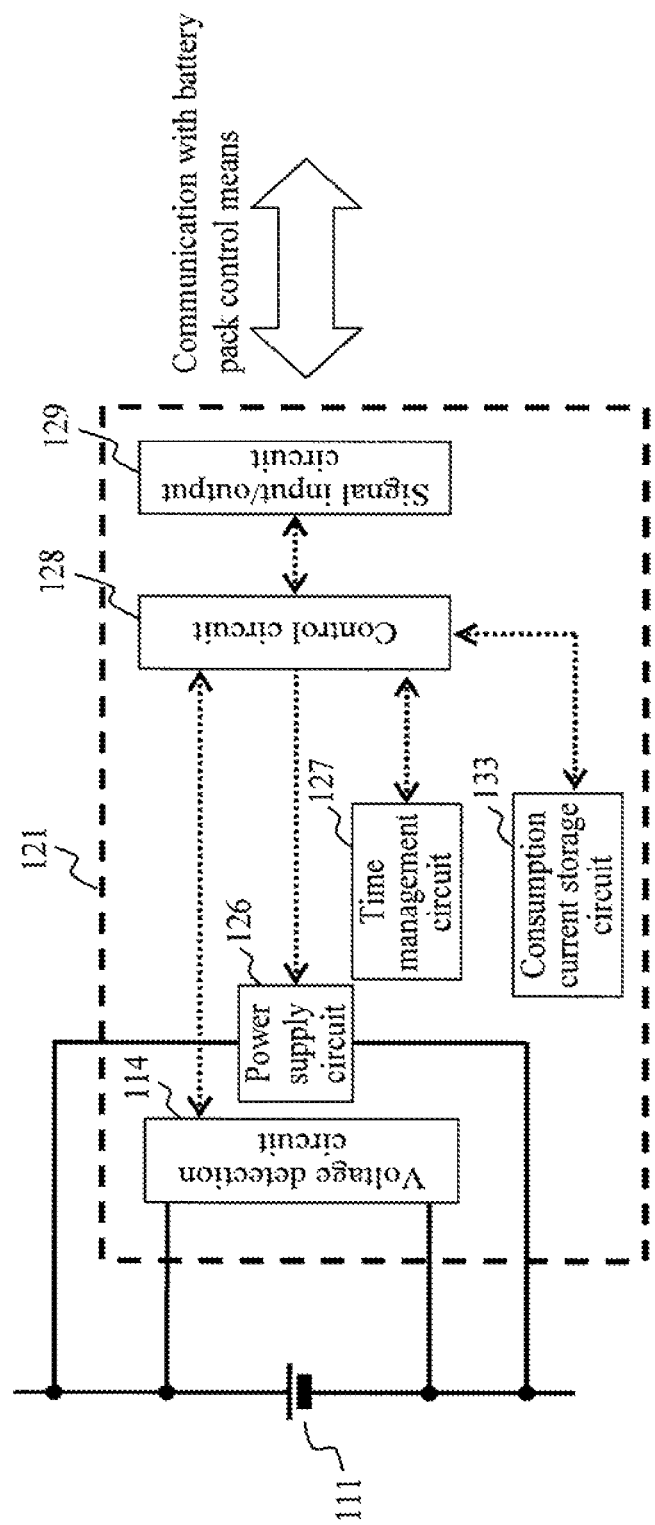
FIG. 24 is a block diagram showing a circuit configuration of an electric cell control means in a seventh embodiment of the present invention.

FIG. 24 shows a circuit configuration of the electric cell control means 121 in this embodiment. The electric cell control means 121 in this embodiment newly includes a consumption current storage circuit 133.

The consumption current storage circuit 133 has a function to store a consumption current value of the electric cell control means 121 in the normal mode. When a battery pack control means 150 sends a command to inquire about a consumption current value, the electric cell control means 121 can notify the battery pack control means 150 of the consumption current value stored in the consumption current storage circuit 133.

The battery pack control means 150 collects, from each of all the electric cell control means 121 forming an electric cell management means 120, the consumption current value stored in the corresponding consumption current storage circuit 133 described above. Then, the battery pack control means 150 keeps track of an operation period in the normal mode of each electric cell control means 121 activated by the battery pack control means itself, and calculates the amount of energy of the electric cell 111 consumed by each electric cell control means 121.

Here, since the consumption current value of the electric cell control means 121 differs from one electric cell control means 121 to another, the amount of energy of the electric cell 111 consumed also differs from one electric cell control means 121 to another, which causes a variation in SOCs of the electric cells 111. Thus, the battery pack control means 150 sets as a reference the amount of consumption energy based on a relatively large consumption current value (for example, a maximum consumption current value or an average consumption current value), calculates a difference between this reference and the amount of energy consumed by each electric cell control means 121, calculates a period of time enough to eliminate this difference with the consumption current value of the electric cell control means 121, and transmits a normal mode operation hold command signal containing the period of time to the electric cell control means 121.

Note that, the keeping of the operation of the electric cell control means 121 in the normal mode according to the normal mode operation hold command signal has the effect of increasing the amount of consumption of energy stored in the electric cell 111. Specifically, the electric cell control means 121 having a small consumption current value is activated in the normal mode for a relatively long time according to the normal mode operation hold command signal, so that its consumption energy is matched with that of the electric cell control means 121 having an average or relatively large consumption current. With this, the variation in SOCs of the electric cells 111 caused by the individual difference in the consumption current among the electric cell control means 121 can be eliminated by eliminating the individual difference in the consumption current value among the electric cell control means 121.

Figure 25:
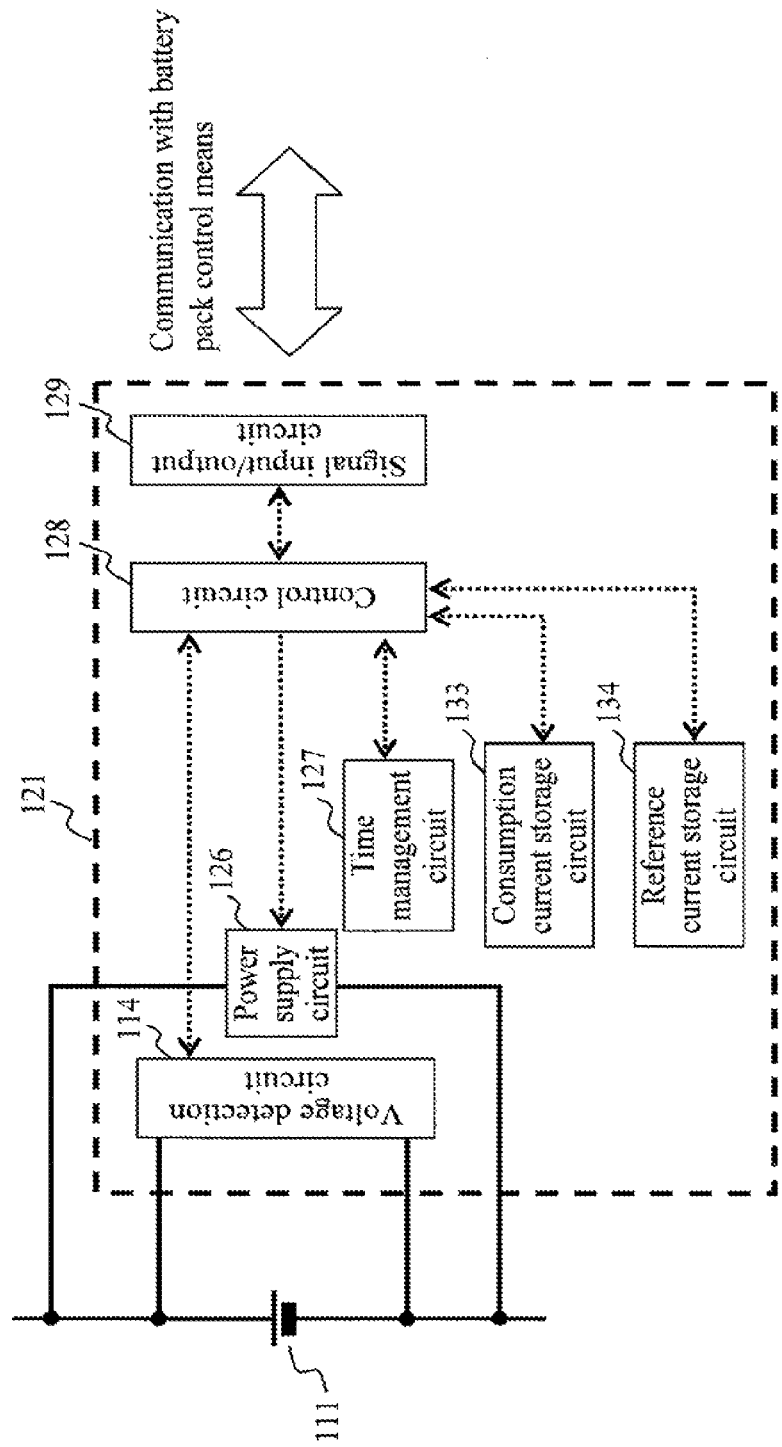
FIG. 25 is a block diagram showing another circuit configuration of the electric cell control means in the seventh embodiment of the present invention.

FIG. 25 shows another different circuit configuration of the electric cell control means 121 in this embodiment. Here, a circuit configuration where a reference current storage circuit 134 is added is employed. In addition, although the time management circuit 127 in the prior embodiments has the function to store a period of time set from the outside and measure a period of time during which the electric cell control means 121 operates in the normal mode independently, a function to measure a period of time during which the electric cell control means 121 operates in the normal mode according to a command from the battery pack control means 150 is also added here.

The reference current storage circuit 134 included in the electric cell control means 121 in FIG. 25 stores a maximum consumption current value, an average consumption current value, or the like of a result of measurement of consumption currents of the multiple electric cell control means 121. The consumption current value stored in the reference current storage circuit 134 is used by each of all the electric cell control means 121 as a target value when the electric cell control means 121 adjusts its amount of consumption energy.

Upon receiving a command sent from the battery pack control means 150, the electric cell control means 121 in FIG. 25 starts to operate in the normal mode. The time management circuit 127 measures a period of time during which the electric cell control means 121 operates in the normal mode according to the command from the battery pack control means 150.

When a command from the battery pack control means 150 is stopped or when an operation stop command from the battery pack control means 150 is sent, the electric cell control means 121 calculates the amount of energy consumed when it has operated in the normal mode according to the command from the battery pack control means 150 by using the period of time during which it has operated in the normal mode according to the command from the battery pack control means 150 and its own consumption current value stored in the consumption current storage circuit 133. At the same time, the electric cell control means 121 calculates the amount of consumption energy of the electric cell control means 121, which is used as a reference, by using the period of time during which the electric cell control means 121 has operated in the normal mode according to the command from the battery pack control means 150 and the reference consumption current value stored in the reference current storage circuit 134.

The control circuit 128 calculates a difference between the amount of consumption energy based on the consumption current value of the electric cell control means 121 stored in the consumption current storage circuit 133 and the amount of consumption energy based on the reference consumption current value of the electric cell control means 121 stored in the reference current storage circuit 134.

In this embodiment, a period of time enough to eliminate the aforementioned difference from the reference amount of consumption energy of the electric cell control means 121 with the consumption current value of the electric cell control means 121 stored in the consumption current storage circuit 133 is calculated. Then, the calculated period of time is stored in the time management circuit 127. After the command from the battery pack control means 150 is stopped or after the operation stop command from the battery pack control means 150 is sent, the time management circuit 127 causes the electric cell control means 121 to operate in the normal mode till the period of time stored in the time management circuit itself elapses. Then, when the time management circuit detects passage of the period of time enough to eliminate the difference from the reference amount of consumption energy, the time management circuit 127 notifies the control circuit 128 of this detected result. The control circuit 128 sends a command to the power supply circuit 126 to shift the mode from the normal mode to the low consumption current mode.

As to the aforementioned period of time during which the normal mode operation is kept, a value corresponding to an operation period in the normal mode according to the command from the battery pack control means 150 may be calculated in advance and stored in advance in the time management circuit 127 of each electric cell control means 121. In this case, it is unnecessary to store the consumption current value of the electric cell control means 121 itself and the reference consumption current value.

The operation continuation in the normal mode by the time management circuit 127 is the function to increase the amount of energy consumed by the electric cell control means 121. The individual difference in the consumption current among the electric cell control means 121 can be eliminated by matching the amount of energy consumed by the electric cell control means 121 having a small consumption current with the relatively large amount of consumption energy (for example, an average or a maximum consumption current value) stored in the reference current storage circuit. Consequently, it is possible to provide the electric cell control means 121 capable of preventing a variation in SOCs of the electric cells 111 to be managed.

Note that, although the description is given taking as an example the configuration in which one electric cell control means 121 is provided for one electric cell 111 in this embodiment, the electric cell control means 121 in this embodiment is also effective in preventing the variation in SOC among the electric cell groups 112 even when one electric cell control means 121 is provided for multiple electric cells 111.

The aforementioned electric cell control means 121 according to the present invention is capable of preventing the situation in which one or more electric cells 111 can be left with SOCs or voltages thereof exceeding a target SOC or a target voltage, by using a simple control circuit, and of eliminating a variation in SOC among the electric cells 111 or electric cell groups 112 which occurs among the electric cell control means 121. In addition, by increasing a consumption current of the electric cell control means 121 as necessary, the aforementioned SOC management can be achieved in a relatively short period of time. The electric cell control means 121 is applicable to various fields such as mobile, UPS, and vehicles such as HEV or EV.

Note that, it is also possible to combine each embodiment described above with one or more modifications. It is also possible to combine modifications in whatever way.

The description above is illustrative only, and the present invention should not be limited to any configuration of the embodiments described above.

EXPLANATION OF REFERENCE NUMERALS

100 battery system
110 battery pack
111 electric cell
112 electric cell group
120 electric cell management means
121 electric cell control means
122 bypass resistance
123 bypass switch
124 voltage detection circuit
125 BSW driving circuit
126 power supply circuit
127 time management circuit
128 control circuit
129 signal input/output circuit
130 current detection means
131 operation change circuit
132 BSW management circuit
133 consumption current storage circuit
134 reference current storage circuit
135 voltage management circuit
140 voltage detection means
150 battery pack control means
400 inverter
410 motor generator
420 charger

What is claimed is:
1. A secondary battery control system comprising:
an electric cell controller that operates using electric power provided by a battery group including two or more bat- teries and that monitors and controls each of the battery included in the battery group from which the electric power is provided; and a battery pack controller that monitors and controls a state of a battery unit including two or more of the battery group by controlling the electric cell controller according to information from the electric cell controller;

wherein the electric cell controller includes: a first adjust unit that adjusts, upon charging or discharging of the battery unit, a voltage or a charge state of the battery included in the battery group; and a second adjust unit that adjusts, when not charging or not discharging the battery unit, a voltage or a charge state of the battery group included in the battery unit.

2. The secondary battery control system according to claim 1, wherein the battery pack controller sets an adjustment target value for adjusting a voltage or a charge state for each of the battery group, and wherein the battery pack controller causes the first adjust unit to adjust a voltage or a charge state of the battery included in the battery group according to the adjustment target value configured for each of the battery group.

3. The secondary battery control system according to claim 1, wherein the first adjust unit includes an adjustment circuit that can, when turned on, decrease a voltage or a charge state for each of the battery included in the battery group.

4. The secondary battery control system according to claim 1, wherein the electric cell controller has a function to switch between a normal mode in which a current consumption or a power consumption is relatively larger and a low consumption mode in which a current consumption or a power consumption is relatively smaller, wherein the battery pack controller sends, to the electric cell controller, an instruction so that the electric cell controller that is provided with electric power from the battery group working with a relatively larger voltage or charge state operates longer than the electric cell controller that is provided with electric power from the battery group working with a relatively smaller voltage or charge state, and wherein the second adjust unit performs the instruction to adjust a voltage or a charge state of the battery group included in the battery unit.

5. The secondary battery control system according to claim 4, wherein a duration for which the second adjust unit operates the electric cell controller in the normal mode is determined according to a duration required for switching a specific or each of the electric cell controller from the normal mode into the; low consumption mode, or according to a voltage required for switching a specific or each of the electric cell controller from the normal mode into the low consumption mode.

6. The secondary battery control system according to claim 1, wherein the charging or discharging of the battery unit corresponds to a timespan in which the battery pack controller is operating, and wherein the not charging or not discharging of the battery unit corresponds to a timespan in which the battery unit control is not operating.

7. A secondary battery system comprising the secondary battery control system according to claim 1 and the battery unit.

8. The secondary battery system according to claim 7, wherein the second adjust unit, in addition to when not charging or not discharging the battery unit, adjusts a voltage or a charge state of the battery group when the battery unit is charged up to a predetermined voltage or a predetermined charge state.

9. A secondary battery system comprising the secondary battery control system according to claim 2 and the battery unit.

10. A secondary battery system comprising the secondary battery control system according to claim 3 and the battery unit.

11. A secondary battery system comprising the secondary battery control system according to claim 4 and the battery unit.

12. A secondary battery system comprising the secondary battery control system according to claim 5 and the battery unit.

13. A secondary battery system comprising the secondary battery control system according to claim 6 and the battery unit.

* * * * *